United States Patent
Hug

(10) Patent No.: US 8,498,942 B2
(45) Date of Patent: Jul. 30, 2013

(54) SYSTEM AND METHOD FOR OBTAINING AND SHARING MEDIA CONTENT

(75) Inventor: Joshua D. Hug, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/452,611

(22) Filed: Apr. 20, 2012

(65) Prior Publication Data

US 2012/0215699 A1  Aug. 23, 2012

Related U.S. Application Data

(60) Division of application No. 11/242,223, filed on Oct. 3, 2005, now Pat. No. 8,185,475, which is a continuation-in-part of application No. 10/719,981, filed on Nov. 21, 2003, now Pat. No. 7,882,034.

(51) Int. Cl.
   *G06F 21/00* (2006.01)

(52) U.S. Cl.
   USPC ................. 705/59; 705/52; 705/54; 705/57; 705/908

(58) Field of Classification Search
   USPC ........................ 705/52, 54, 57, 908
   See application file for complete search history.

(56) References Cited

U.S. PATENT DOCUMENTS

| | | |
|---|---|---|
| 5,586,264 A | 12/1996 | Belknap et al. |
| 5,629,980 A | 5/1997 | Stefik et al. |
| 5,655,144 A | 8/1997 | Milne et al. |
| 5,708,422 A | 1/1998 | Blonder et al. |
| 5,819,160 A | 10/1998 | Foladare et al. |
| 5,857,020 A | 1/1999 | Peterson, Jr. |
| 5,892,900 A | 4/1999 | Ginter et al. |
| 6,151,634 A | 11/2000 | Glaser et al. |
| 6,236,971 B1 | 5/2001 | Stefik et al. |
| 6,434,621 B1 | 8/2002 | Pezzillo et al. |
| 6,560,651 B2 | 5/2003 | Mott et al. |
| 6,597,961 B1 | 7/2003 | Cooke |
| 6,842,906 B1 | 1/2005 | Bowman-Amuah |
| 6,853,728 B1 | 2/2005 | Kahn et al. |
| 7,882,034 B2 | 2/2011 | Hug et al. |
| 8,185,475 B2 | 5/2012 | Hug |
| 2001/0044851 A1 | 11/2001 | Rothman et al. |
| 2002/0002039 A1 | 1/2002 | Qureshey et al. |
| 2002/0013784 A1 | 1/2002 | Swanson |
| 2002/0157034 A1 | 10/2002 | Sagar |

(Continued)

FOREIGN PATENT DOCUMENTS

| | | |
|---|---|---|
| GB | 2405718 A | 3/2005 |
| JP | 2002325221 | 8/2002 |

OTHER PUBLICATIONS

Merriam-Webster's Collegiate Dictionary 10th Ed., Merriam-Webster, Inc., Springfield, MA, p. 576, 1993.*

(Continued)

*Primary Examiner* — Calvin Cheung
(74) *Attorney, Agent, or Firm* — Stoel Rives LLP

(57) ABSTRACT

A device initialization method includes generating a license request for a personal media device. A timeout indicator may be obtained for a subscription associated with the personal media device. The license request and the timeout indicator may be combined to form a device license for the personal media device. The device license may be digitally-signed to form a signed device license.

15 Claims, 18 Drawing Sheets

U.S. PATENT DOCUMENTS

| | | |
|---|---|---|
| 2002/0198846 A1 | 12/2002 | Lao |
| 2003/0163684 A1 | 8/2003 | Fransdonk |
| 2003/0189879 A1 | 10/2003 | Ishii et al. |
| 2003/0236905 A1 | 12/2003 | Choi et al. |
| 2004/0139312 A1 | 7/2004 | Medvinsky |
| 2004/0181490 A1* | 9/2004 | Gordon et al. ............... 705/59 |
| 2005/0010531 A1 | 1/2005 | Kushalnagar et al. |
| 2005/0022019 A1 | 1/2005 | Medvinsky et al. |
| 2005/0094516 A1 | 5/2005 | Morimoto et al. |
| 2005/0203959 A1 | 9/2005 | Muller et al. |
| 2006/0085349 A1 | 4/2006 | Hug |
| 2006/0085351 A1 | 4/2006 | Hug |

OTHER PUBLICATIONS

DeviceSecurity:1 Service Template, Upnp.Org website, Nov. 17, 2003, all pages.*

Office Action mailed Sep. 16, 2008, for U.S. Appl. No. 11/242,339, filed Oct. 3, 2005.

Belt, David, "Cable 3.0: DRM for Linear Content Delivery," CableLabs, all pages, Dec. 2010. http://www.cablelabs.com/about/inventions/downloads/60280-supp-materials(Belt.)pdf.

International Preliminary Report on Patentability dated Apr. 17, 2008 received in International No. PCT/US2006/038596 (7 Pages).

Notification of Transmittal of the International Search Report and the Written Opinion of the International Searching Authority, or the Declaration, for International Application PCT/US06/38496, filed Oct. 2, 2006.

Office Action mailed Mar. 15, 2010, for U.S. Appl. No. 10/719,981, filed Nov. 21, 2003.

Office Action mailed Feb. 9, 2009, for U.S. Appl. No. 10/719,981, filed Nov. 21, 2003.

Office Action mailed Jun. 13, 2008, for U.S. Appl. No. 10/719,981, filed Nov. 21, 2003.

Office Action mailed Sep. 27, 2007, for U.S. Appl. No. 10/719,981, filed Nov. 21, 2003.

Office Action mailed Oct. 26, 2009, for U.S. Appl. No. 11/242,339, filed Oct. 3, 2005.

Office Action mailed Mar. 4, 2009, for U.S. Appl. No. 11/242,223, filed Oct. 3, 2005.

Office Action mailed Dec. 1, 2009, for U.S. Appl. No. 11/242,223, filed Oct. 3, 2005.

* cited by examiner

SYSTEM AND METHOD FOR OBTAINING AND SHARING MEDIA CONTENT

RELATED APPLICATIONS

This application is a divisional of U.S. patent application Ser. No. 11/242,223, filed Oct. 3, 2005, entitled SYSTEM AND METHOD FOR OBTAINING AND SHARING MEDIA CONTENT, now issued as U.S. Pat. No. 8,185,475, which is a continuation-in-part of U.S. patent application Ser. No. 10/719,981, filed Nov. 21, 2003, entitled DIGITAL RIGHTS MANAGEMENT FOR CONTENT RENDERING ON PLAYBACK DEVICES, now issued as U.S. Pat. No. 7,882,034. Both of the foregoing applications are fully incorporated herein by reference.

TECHNICAL FIELD

This invention relates to sharing media content and, more particularly, to sharing media content between multiple personal media devices.

BACKGROUND

Media distribution systems (e.g., the Rhapsody™ and Rhapsody-to-Go™ services offered by RealNetworks™ of Seattle, Wash.) distribute media content to a client electronic device (e.g., an MP3 player) from a media server. A media distribution system may distribute media content by allowing a user to download media data files and/or receive and process media data streams.

When media data files are traditionally downloaded to a user's client electronic device, each media data file downloaded is licensed for exclusive use on the user's client electronic device, such that the usage rights (associated with the downloaded media data file) are passed to the client electronic device at the time that the media data file is downloaded.

Often, a user of a first client electronic device may wish to share a media data file (e.g., a song) with a user of a second client electronic device. Unfortunately, as the media data files are licensed for exclusive use on a specific client electronic device, the media data file may not be directly transferred from the first client electronic device to the second client electronic device. Accordingly, the user of the second client electronic device would typically be required to obtain the media data file from the media distribution system.

SUMMARY OF DISCLOSURE

In a first implementation, a device initialization method includes generating a license request for a personal media device. A timeout indicator may be obtained for a subscription associated with the personal media device. The license request and the timeout indicator may be combined to form a device license for the personal media device. The device license may be digitally-signed to form a signed device license.

DETAILED DESCRIPTION OF THE PREFERRED EMBODIMENTS

System Overview

Figure 1:
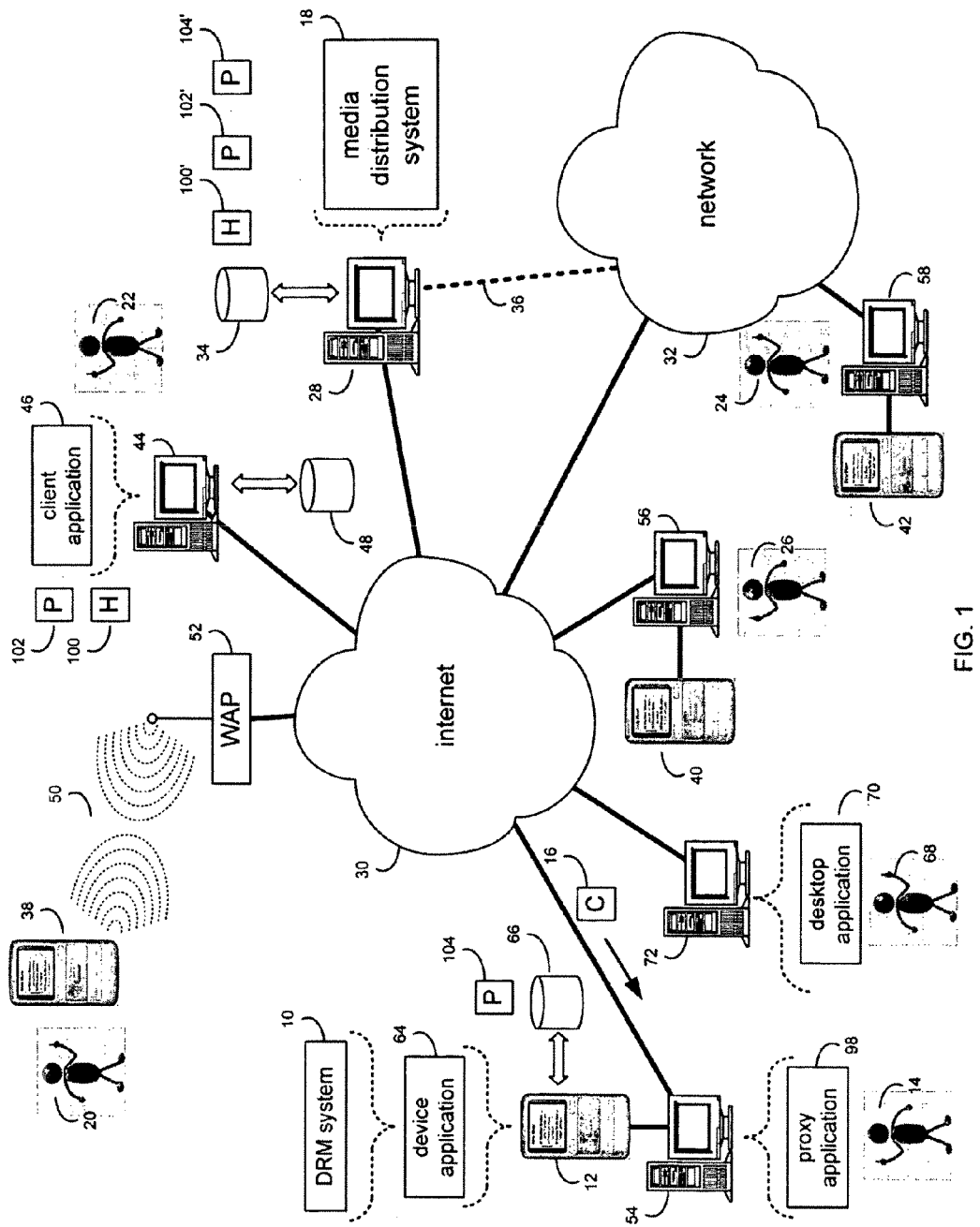
FIG. 1 is a diagrammatic view of a DRM process, a media distribution system, a client application, a proxy application, and a personal media device coupled to a distributed computing network.

Referring to FIG. 1, there is shown a DRM (i.e., digital rights management) process 10 that may be resident on and executed by personal media device 12. As will be discussed below in greater detail, DRM process 10 allows a user (e.g., user 14) of personal media device 12 to manage media content 16 resident on personal media device 12. Examples of personal media device 12 include a laptop/notebook computer, a PDA (i.e., personal digital assistant), a cellular telephone, a portable media player (e.g., an MP3 player), a pager, a wireless email device (e.g., a Blackberry™ device), and/or a portable gaming device (e.g., a Playstation™ Portable), for example. Personal media device 12 typically receives media content 16 from media distribution system 18.

As will be discussed below in greater detail, examples of the format of the media content 16 received from media distribution system 18 may include: purchased downloads received from media distribution system 18 (i.e., media content licensed to e.g., user 14 for use in perpetuity); subscription downloads received from media distribution system 18 (i.e., media content licensed to e.g., user 14 for use while a valid subscription exists with media distribution system 18); and media content streamed from media distribution system 18, for example. Typically, when media content 16 is streamed from e.g., computer 28 (i.e., which may include, but is not limited to, a server computer, a desktop computer, a laptop computer, a personal digital assistant, or a series of servers, for example) to personal media device 12, a copy of the media content 16 is not permanently retained on personal media device 12. In addition to media distribution system 18, media content 16 may be obtained from other sources, examples of which may include but are not limited to files ripped from music compact discs.

Examples of the types of media content 16 distributed by media distribution system 18 include: audio files (examples of which may include but are not limited to music files, audio news broadcasts, audio sports broadcasts, and audio recordings of books, for example); video files (examples of which may include but are not limited to video footage that does not include sound, for example); audio/video files (examples of which may include but are not limited to a/v news broadcasts, a/v sports broadcasts, feature-length movies and movie clips, music videos, and episodes of television shows, for example); and multimedia content (examples of which may include but are not limited to interactive presentations and slideshows, for example).

Media distribution system 18 typically provides media data streams and/or media data files to a plurality of users (e.g., users 14, 20, 22, 24, 26). Examples of such a media distribution system 18 include the Rhapsody™ service and Rhapsody-To-Go™ service offered by RealNetworks™ of Seattle, Wash. Prior to transmission, media distribution system 18 may encode the media data streams and/or media data files into e.g., MP3 (i.e., Motion Picture Experts Group Audio Layer 3) format, AAC (i.e., Advanced Audio Coding) format, RealAudio™ format, Quicktime™ format, and AVI (i.e., Audio Video Interleave) format, for example. Upon receipt, the streams/files may be decoded (using the appropriate decoder) and rendered.

Media distribution system 18 is typically a server application that resides on and is executed by computer 28 (e.g., a server computer) that is connected to network 30 (e.g., the Internet). Computer 28 may be a web server (or series of many connected servers) running a network operating system, examples of which may include but are not limited to Microsoft Windows 2000 Server™, Novell Netware™, or Redhat Linux™.

Typically, computer 28 also executes a web server application, examples of which may include but are not limited to Microsoft IIS™, Novell Webserver™, or Apache Webserver™, that allows for HTTP (i.e., HyperText Transfer Protocol) access to computer 28 via network 30. Network 30 may be connected to one or more secondary networks (e.g., network 32), such as: a local area network; a wide area network; or an intranet, for example.

The instruction sets and subroutines of media distribution system 18, which are typically stored on a storage device 34 coupled to computer 28, are executed by one or more processors (not shown) and one or more memory architectures (not shown) incorporated into computer 28. Storage device 34 may include but are not limited to a hard disk drive, a tape drive, an optical drive, a RAID array, a random access memory (RAM), or a read-only memory (ROM).

Users 14, 20, 22, 24, 26 may access media distribution system 18 directly through network 30 or through secondary network 32. Further, computer 28 (i.e., the computer that executes media distribution system 18) may be connected to network 30 through secondary network 32, as illustrated with phantom link line 36.

Users 14, 20, 22, 24, 26 may access media distribution system 18 through various client electronic devices, examples of which may include but are not limited to personal media devices 12, 38, 40, 42, client computer 44, laptop computers (not shown), personal digital assistants (not shown), cellular telephones (not shown), televisions (not shown), cable boxes (not shown), internet radios (not shown), or dedicated network devices (not shown), for example.

The various client electronic devices may be directly or indirectly coupled to network 30 (or network 32). For example, client computer 44 is shown directly coupled to network 30 via a hardwired network connection. Further, client computer 44 may execute a client application 46 (examples of which may include but are not limited to Microsoft Internet Explorer™, Netscape Navigator™, RealRhapsody™ client, RealPlayer™ client, or a specialized interface) that allows e.g., user 22 to access and configure media distribution system 18 via network 30 (or network 32). Client computer 44 may run an operating system, examples of which may include but are not limited to Microsoft Windows™, or Redhat Linux™.

The instruction sets and subroutines of client application 46, which are typically stored on a storage device 48 coupled to client computer 44, are executed by one or more processors (not shown) and one or more memory architectures (not shown) incorporated into client computer 44. Storage device 48 may include but are not limited to a hard disk drive, a tape drive, an optical drive, a RAID array, a random access memory (RAM), or a read-only memory (ROM).

As discussed above, the various client electronic devices may be indirectly coupled to network 30 (or network 32). For example, personal media device 38 is shown wireless coupled to network 30 via a wireless communication channel 50 established between personal media device 38 and wireless access point (i.e., WAP) 52, which is shown directly coupled to network 30. WAP 52 may be, for example, an IEEE 802.11a, 802.11b, 802.11g, Wi-Fi, and/or Bluetooth device that is capable of establishing secure communication channel 50 between personal media device 38 and WAP 52.

As is known in the art, all of the IEEE 802.11x specifications use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

In addition to being wirelessly coupled to network 30 (or network 32), personal media devices may be coupled to network 30 (or network 32) via a proxy computer (e.g., proxy computer 54 for personal media device 12, proxy computer 56 for personal media device 40, and proxy computer 58 for personal media device 42, for example).

Figure 2:
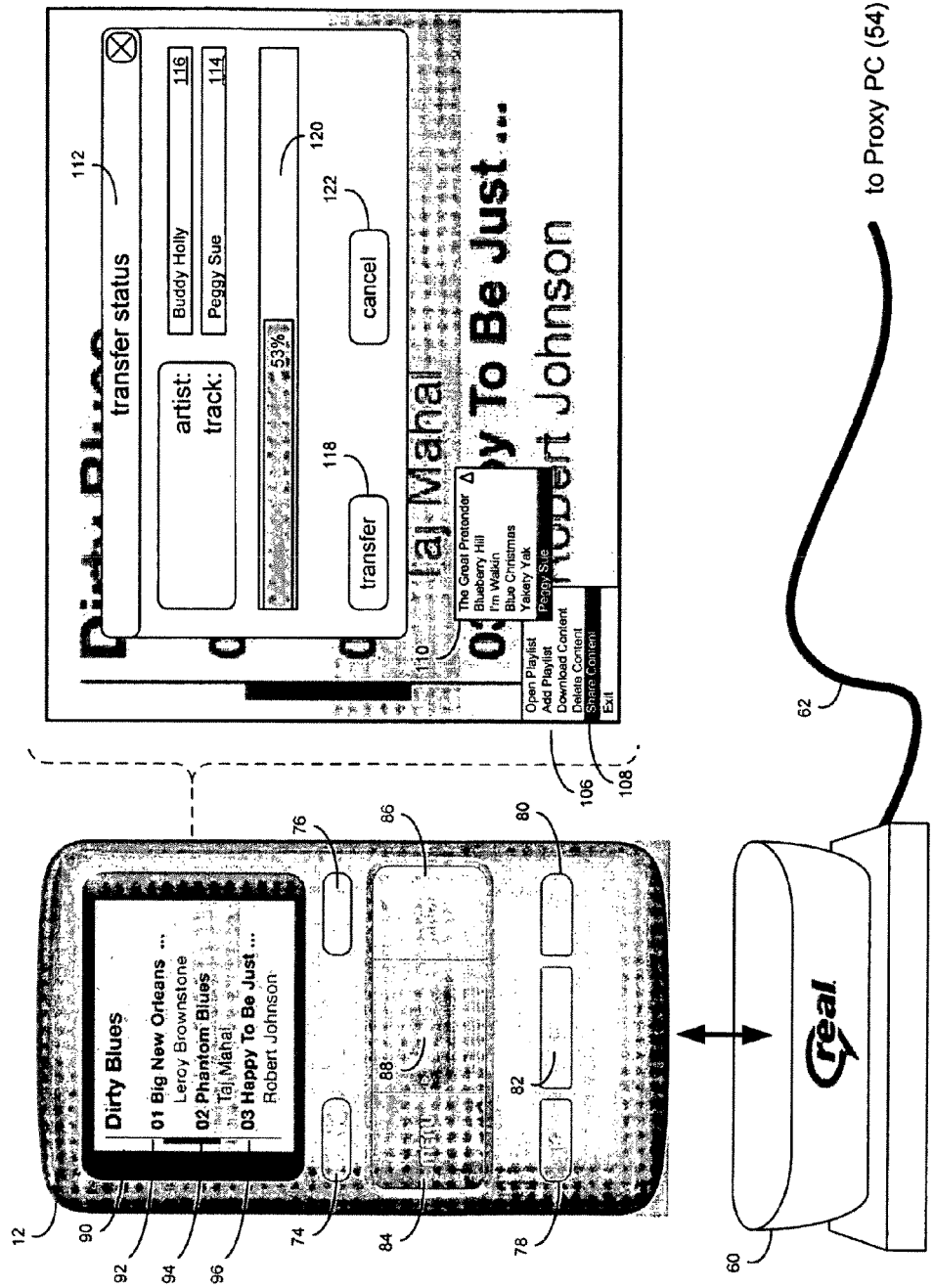
FIG. 2 is an isometric view of the personal media device of FIG. 1.

Personal Media Device:

For example and referring also to FIG. 2, personal media device 12 may be connected to proxy computer 54 via a docking cradle 60. Typically, personal media device 12 includes a bus interface (to be discussed below in greater detail) that couples personal media device 12 to docking cradle 60. Docking cradle 60 may be coupled (with cable 62) to e.g., a universal serial bus (i.e., USB) port, a serial port, or an IEEE 1394 (i.e., FireWire) port included within proxy computer 54.

The bus interface included within personal media device 12 may be a USB interface, and docking cradle 60 may function as a USB hub (i.e., a plug-and-play interface that allows for "hot" coupling and uncoupling of personal media device 12 and docking cradle 60).

Proxy computer 54 may function as an Internet gateway for personal media device 12. Accordingly, personal media device 12 may use proxy computer 54 to access media distribution system 18 via network 30 (and network 32) and obtain media content 16. Specifically, upon receiving a request for media distribution system 18 from personal media device 12, proxy computer 54 (acting as an Internet client on behalf of personal media device 12), may request the appropriate web page/service from computer 28 (i.e., the computer that executes media distribution system 18). When the requested web page/service is returned to proxy computer 54, proxy computer 54 relates the returned web page/service to the original request (placed by personal media device 12) and forwards the web page/service to personal media device 12. Accordingly, proxy computer 54 may function as a conduit for coupling personal media device 12 to computer 28 and, therefore, media distribution system 18.

Further, personal media device 12 may execute a device application 64 (examples of which may include but are not limited to RealRhapsody™ client, RealPlayer™ client, or a specialized interface). Personal media device 12 may run an operating system, examples of which may include but are not limited to Microsoft Windows CE™, Redhat Linux™, Palm OS™, or a device-specific (i.e., custom) operating system.

DRM process 10 is typically a component of device application 64 (examples of which may include but are not limited to an embedded feature of device application 64, a software plug-in for device application 64, or a stand-alone application called from within and controlled by device application 64). The instruction sets and subroutines of device application 64 and DRM process 10, which are typically stored on a storage device 66 coupled to personal media device 12, are executed by one or more processors (not shown) and one or more memory architectures (not shown) incorporated into personal media device 12. Storage device 66 may be, for example, a hard disk drive, an optical drive, a random access memory (RAM), a read-only memory (ROM), a CF (i.e., compact flash) card, an SD (i.e., secure digital) card, a SmartMedia card, a Memory Stick, and a MultiMedia card.

An administrator 68 typically accesses and administers media distribution system 18 through a desktop application 70 (examples of which may include but are not limited to Microsoft Internet Explorer™, Netscape Navigator™, or a specialized interface) running on an administrative computer 72 that is also connected to network 30 (or network 32).

The instruction sets and subroutines of desktop application 70, which are typically stored on a storage device (not shown) coupled to administrative computer 72, are executed by one or more processors (not shown) and one or more memory architectures (not shown) incorporated into administrative computer 72. The storage device (not shown) coupled to administrative computer 72 may include but are not limited to a hard disk drive, a tape drive, an optical drive, a RAID array, a random access memory (RAM), or a read-only memory (ROM).

Figure 3:
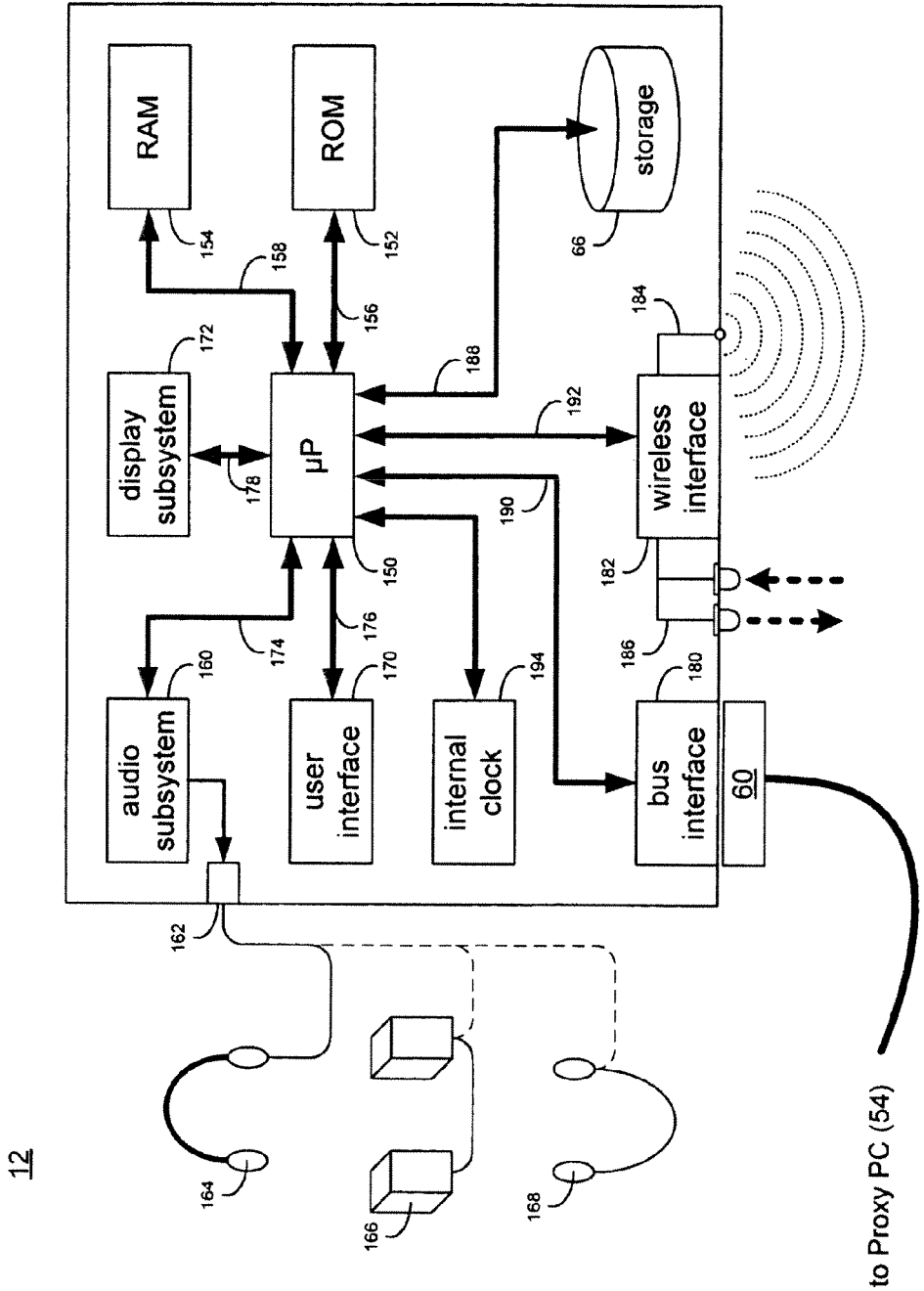
FIG. 3 is a diagrammatic view of the personal media device of FIG. 1.

Referring also to FIG. 3, a diagrammatic view of personal media device 12 is shown. Personal media device 12 typically includes microprocessor 150 (e.g., an ARM™ microprocessor produced by Intel™ of Santa Clara, Calif.), non-volatile memory (e.g., read-only memory 152), and volatile memory (e.g., random access memory 154); each of which may be interconnected via one or more data/system buses 156, 158. Personal media device 12 may also include an audio subsystem 160 for providing e.g., an analog audio signal to an audio jack 162 for removable engaging e.g., headphone assembly 164, remote speaker assembly 166, or ear bud assembly 168, for example. Alternatively, personal media device 12 may be configured to include one or more internal audio speakers (not shown).

Personal media device 12 may also include a user interface 170 and a display subsystem 172. User interface 170 may receive data signals from various input devices included within personal media device 12, examples of which may include (but are not limited to): rating switches 74, 76; backward skip switch 78; forward skip switch 80; play/pause switch 82; menu switch 84; radio switch 86; and slider assembly 88, for example. Display subsystem 172 may provide display signals to display panel 90 included within personal media device 12. Display panel 90 may be an active matrix liquid crystal display panel, a passive matrix liquid crystal display panel, or a light emitting diode display panel, for example.

Audio subsystem 160, user interface 170, and display subsystem 172 may each be coupled with microprocessor 150 via one or more data/system buses 174, 176, 178 (respectively).

During use of personal media device 12, display panel 90 may be configured to display e.g., the title and artist of various pieces of media content 92, 94, 96 stored within personal media device 12. Slider assembly 88 may be used to scroll upward or downward through the list of media content stored within personal media device 12. When the desired piece of media content is highlighted (e.g., "Phantom Blues" by "Taj Mahal"), user 14 may select the media content for rendering using play/pause switch 82. User 14 may skip forward to the next piece of media content (e.g., "Happy To Be Just . . . " by "Robert Johnson") using forward skip switch 80; or skip backward to the previous piece of media content (e.g., "Big New Orleans . . . " by "Leroy Brownstone") using backward skip switch 78. Additionally, user 14 may rate the media content as they listen to it by using rating switches 74, 76.

As discussed above, personal media device 12 may include a bus interface 180 for interfacing with e.g., proxy computer 54 via docking cradle 60. Additionally and as discussed above, personal media device 12 may be wireless coupled to network 30 (and/or other personal media devices) via e.g., a wireless communication channel 50 established between personal media device 12 and e.g., WAP 52. Accordingly, personal media device 12 may include a wireless interface 182 for wirelessly-coupling personal media device 12 to network 30 (or network 32) and/or other personal media devices. Wireless interface 182 may be coupled to an antenna assembly 184 for RF communication to e.g., WAP 52, and/or an IR (i.e., infrared) communication assembly 186 for infrared communication with e.g., a second personal media device (such as personal media device 40).

As discussed above, personal media device 12 may include a storage device 66 for storing the instruction sets and subroutines of device application 64 and DRM process 10. Additionally, storage device 66 may be used to store media data files downloaded from media distribution system 18 and to temporarily store media data streams (or portions thereof) streamed from media distribution system 18.

Storage device 66, bus interface 180, and wireless interface 182 may each be coupled with microprocessor 150 via one or more data/system buses 188, 190, 192 (respectively).

As discussed above, media distribution system 18 distributes media content to users 14, 20, 22, 24, 26, such that the media content distributed may be in the form of media data streams and/or media data files.

Accordingly, media distribution system 18 may be configured to only allow users to download media data files. For example, user 14 may be allowed to download, from media distribution system 18, media data files (i.e., examples of which may include but are not limited to MP3 files or AAC files), such that copies of the media data file are transferred from computer 28 to personal media device 12 (being stored on storage device 66).

Alternatively, media distribution system 18 may be configured to only allow users to receive and process media data streams of media data files. For example, user 22 may be allowed to receive and process (on client computer 44) media data streams received from media distribution system 18. As discussed above, when media content is streamed from e.g., computer 28 to client computer 44, a copy of the media data file is not permanently retained on client computer 44.

Further, media distribution system 18 may be configured to allow users to receive and process media data streams and download media data files. Examples of such a media distribution system include the Rhapsody™ and Rhapsody-to-Go™ services offered by RealNetworks™ of Seattle, Wash. Accordingly, user 14 may be allowed to download media data files and receive and process media data streams from media distribution system 18. Therefore, copies of media data files may be transferred from computer 28 to personal media device 12 (i.e., the received media data files being stored on storage device 66); and streams of media data files may be received from computer 28 by personal media device 12 (i.e., with portions of the received stream temporarily being stored on storage device 66). Additionally, user 22 may be allowed to download media data files and receive and process media data streams from media distribution system 18. Therefore, copies of media data files may be transferred from computer 28 to client computer 44 (i.e., the received media data files being stored on storage device 48); and streams of media data files may be received from computer 28 by client computer 44 (i.e., with portions of the received streams temporarily being stored on storage device 48).

Typically, in order for a device to receive and process a media data stream from e.g., computer 28, the device must have an active connection to computer 28 and, therefore, media distribution system 18. Accordingly, personal media device 38 (i.e., actively connected to computer 28 via wireless channel 50), and client computer 44 (i.e., actively connected to computer 28 via a hardwired network connection) may receive and process media data streams from e.g., computer 28.

As discussed above, proxy computers 54, 56, 58 may function as a conduit for coupling personal media devices 12, 40, 42 (respectively) to computer 28 and, therefore, media distribution system 18. Accordingly, when personal media devices 12, 40, 42 are coupled to proxy computers 54, 56, 58 (respectively) via e.g., docking cradle 60, personal media devices 12, 40, 42 are actively connected to computer 28 and, therefore, may receive and process media data streams provided by computer 28.

User Interfaces:

As discussed above, media distribution system 18 may be accessed using various types of client electronic devices, which include but are not limited to personal media devices 12, 38, 40, 42, client computer 44, personal digital assistants (not shown), cellular telephones (not shown), televisions (not shown), cable boxes (not shown), internet radios (not shown), or dedicated network devices (not shown), for example. Typically, the type of interface used by the user (when configuring media distribution system 18 for a particular client electronic device) will vary depending on the type of client electronic device to which the media content is being streamed/downloaded.

For example, as the embodiment shown (in FIG. 2) of personal media device 12 does not include a keyboard and the display panel 90 of personal media device 12 is compact, media distribution system 18 may be configured for personal media device 12 via proxy application 98 executed on proxy computer 54.

The instruction sets and subroutines of proxy application 98, which are typically stored on a storage device (not shown) coupled to proxy computer 54, are executed by one or more processors (not shown) and one or more memory architectures (not shown) incorporated into proxy computer 54. The storage device (not shown) coupled to proxy computer 54 may include but are not limited to a hard disk drive, a tape drive, an optical drive, a RAID array, a random access memory (RAM), or a read-only memory (ROM).

Additionally and for similar reasons, personal digital assistants (not shown), cellular telephones (not shown), televisions (not shown), cable boxes (not shown), internet radios (not shown), and dedicated network devices (not shown) may use proxy application 98 executed on proxy computer 54 to configure media distribution system 18.

Further, the client electronic device need not be directly connected to proxy computer 54 for media distribution system 18 to be configured via proxy application 98. For example, assume that the client electronic device used to access media distribution system 18 is a cellular telephone. While cellular telephones are typically not physically connectable to e.g., proxy computer 54, proxy computer 54 may still be used to remotely configure media distribution system 18 for use with the cellular telephone. Accordingly, the configuration information (concerning the cellular telephone) that is entered via e.g., proxy computer 54 may be retained within media distribution system 18 (on computer 28) until the next time that the user accesses media distribution system 18 with the cellular telephone. At that time, the configuration information saved on media distribution system 18 may be downloaded to the cellular telephone.

For systems that include keyboards and larger displays (e.g., client computer 44), client application 46 may be used to configure media distribution system 18 for use with client computer 44.

Figure 4:
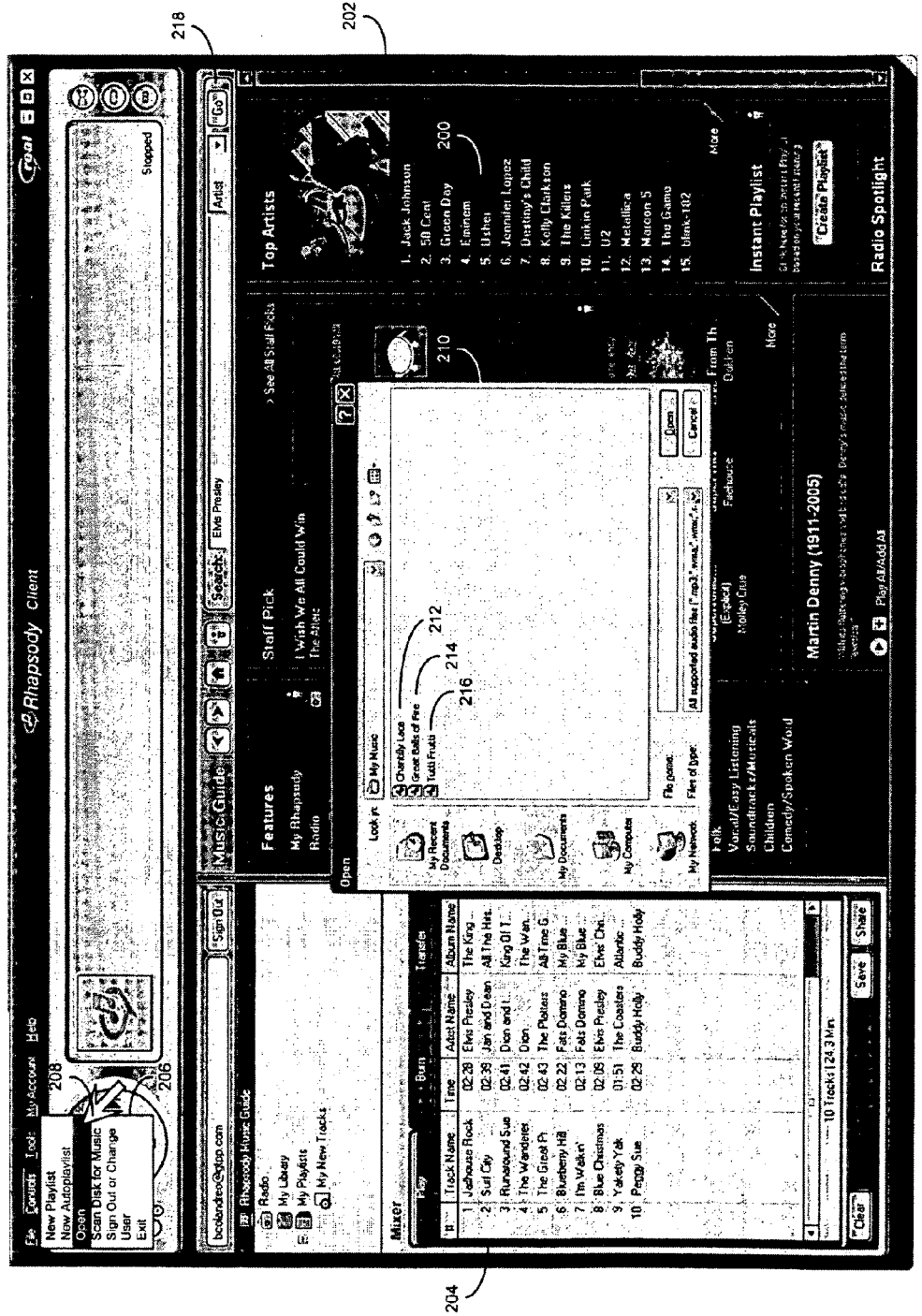
FIG. 4 is a display screen rendered by the client application of FIG. 1.

Referring also to FIG. 4, when using client application 46 to access media distribution system 18, user 22 may be presented with an information display screen 200 rendered by client application 46. Client application 46 typically includes a user interface 202 (e.g., a web browser) for interfacing with media distribution system 18 and viewing information display screen 200.

When e.g., user 22 streams/downloads media content from e.g., computer 28, media distribution system 18 may monitor the media content streamed/downloaded to the user's client electronic device (e.g., client computer 44, for example), resulting in the generation of a media history file 100 (FIG. 1) for that user. While media history file 100 is typically maintained locally (e.g., maintained on client computer 44), media history file 100 may alternatively/additionally be maintained remotely (e.g., maintained on computer 28) as a remote media history file 100'.

The user (e.g., user 22) may save this media history file (or portions thereof) as a playlist. A playlist is typically a group of tracks (examples of which may include, but are not limited to, songs, videos, news broadcasts, sports broadcasts, etc) that media distribution system 18 will render in sequence. This, in turn, allows the user to compile custom music compilations (in the form of multiple playlists).

A history window 204 may be rendered by client application 46 that itemizes the information contained within media history file 100. In this example, history window 204 itemizes ten (10) media data streams (e.g., "Jailhouse Rock"; "Surf City"; "Runaround Sue"; "The Wanderer"; "The Great Pretender"; "Blueberry Hill"; "I'm Walkin'"; "Blue Christmas"; "Yakety Yak"; and "Peggy Sue"), thus indicating that user 22 had previously listened to those ten (10) media data streams.

In addition to media data streams (i.e., media data streams received from a remote device e.g., computer 28), client application 46 allows user 12 to render local media data files. As discussed above, a local media data file may be a purchased download received from media distribution system 18 (i.e., media content licensed to e.g., user 14 for use in perpetuity); a subscription download received from media distribution system 18 (i.e., media content licensed to e.g., user 14 for use while a valid subscription exists with media distribution system 18); and/or a media data file extracted (i.e., ripped) from e.g., a music compact disc, for example. These local media data files are typically stored locally on e.g., storage device 48 coupled to client computer 44.

If user 22 wishes to render a local media data file (i.e., a file stored on client computer 44), user 22 may e.g., select the file(s) to be rendered using client application 46. Accordingly, user 22 may select the dropdown "File" menu 206 using screen pointer 208, which may be controllable by a pointing device (e.g., a computer mouse, not shown). Selecting the "Open" command may result in client application 46 rendering file management window 210, which allows user 22 to select local media data files for playback.

In this example, file management window 210 defines three (3) local media data files, namely: "Chantilly Lace" 212; "Great Balls of Fire" 214; and "Tutti Frutti" 216, all of which are stored within the folder "My Music". User 22 may select any (or all) of these files for playback on client application 46.

A search window 218 allows a user (e.g., user 22) to search for media content. For example, user 22 may enter search terms (e.g., "Elvis Presley"), select the appropriate term type (e.g., artist), and execute a query. In the event that multiple artists satisfy the query, a result set may be generated from which user 22 may select e.g., the appropriate artist. Once the appropriate artist is selected, user 22 may review the various albums released by the selected artist (or that include tracks by the selected artist). User 22 may then stream or download one or more of the various tracks included within any of the albums. Once a track is rendered, identifying information concerning the track rendered may be added to local media history file 100 and/or remote media history file 100' and may be included in history window 204. In addition to being able to search for media content by artist, user 14 may also be able to search for media content by e.g., keyword, track, album and/or composer, for example.

Figure 5:
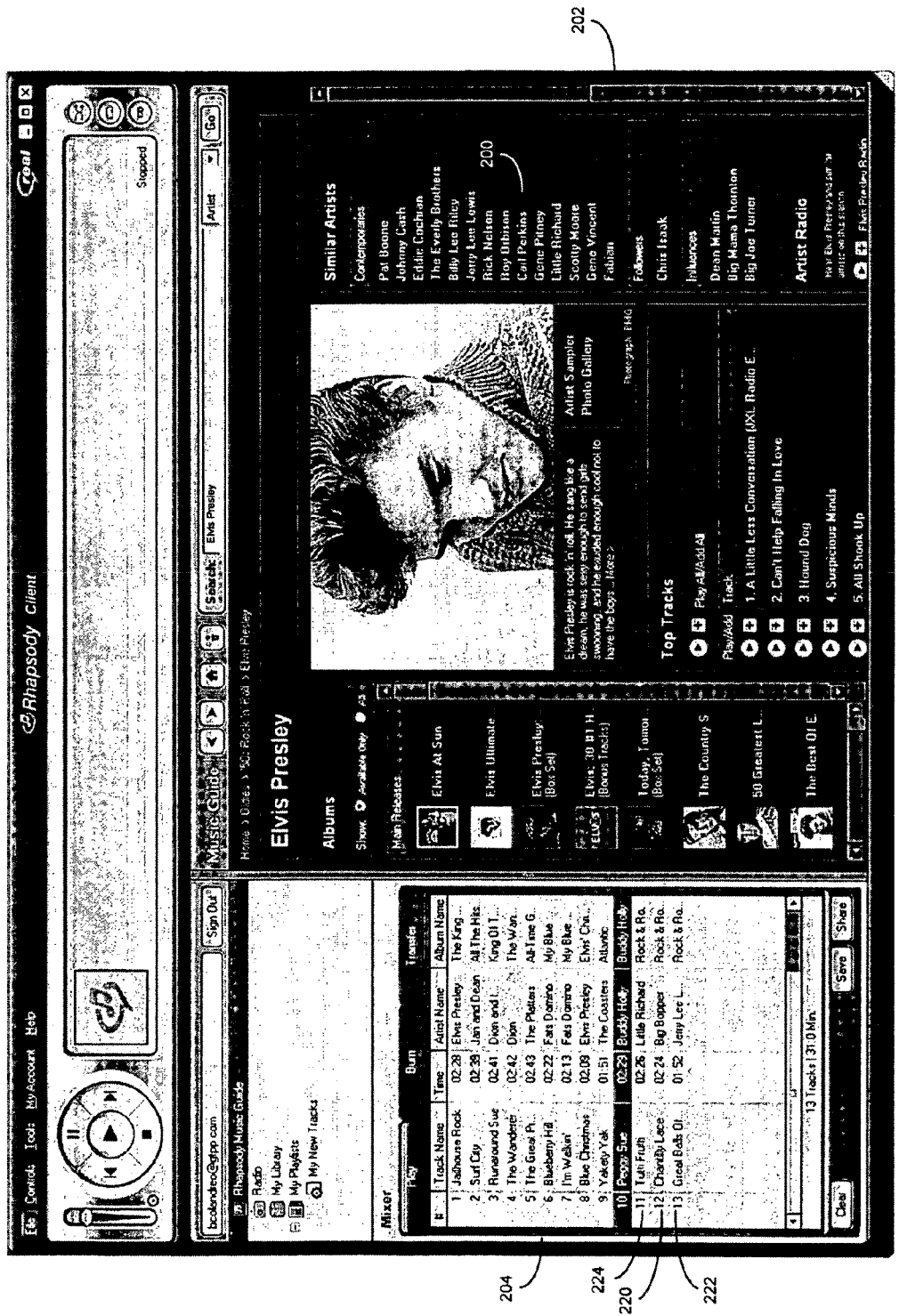
FIG. 5 is a display screen rendered by the client application of FIG. 1.

Referring also to FIG. 5 and assuming that user 22 selects all three local media data files for playback, media history file 100 may be amended to include three additional entries, namely one for "Chantilly Lace"; one for "Great Balls of Fire"; and one for "Tutti Frutti". Accordingly, as history window 204 itemizes the information contained within media history file 100, history window 204 will include three additional entries (i.e., entries 220, 222, 224), which correspond to local media data file "Chantilly Lace" 212; local media data file "Great Balls of Fire" 214; and local media data file "Tutti Frutti" 216.

Assuming that user 22 wishes to save this collection of music for future playback, user 22 may save the current media history file 100 (or a portion thereof) as a playlist 102 (FIG. 1). While playlist 102 is typically maintained locally (e.g., maintained on client computer 44), playlist 102 may alternatively/additionally be maintained remotely (e.g., maintained on computer 28) as a remote playlist 102'.

Figure 6:
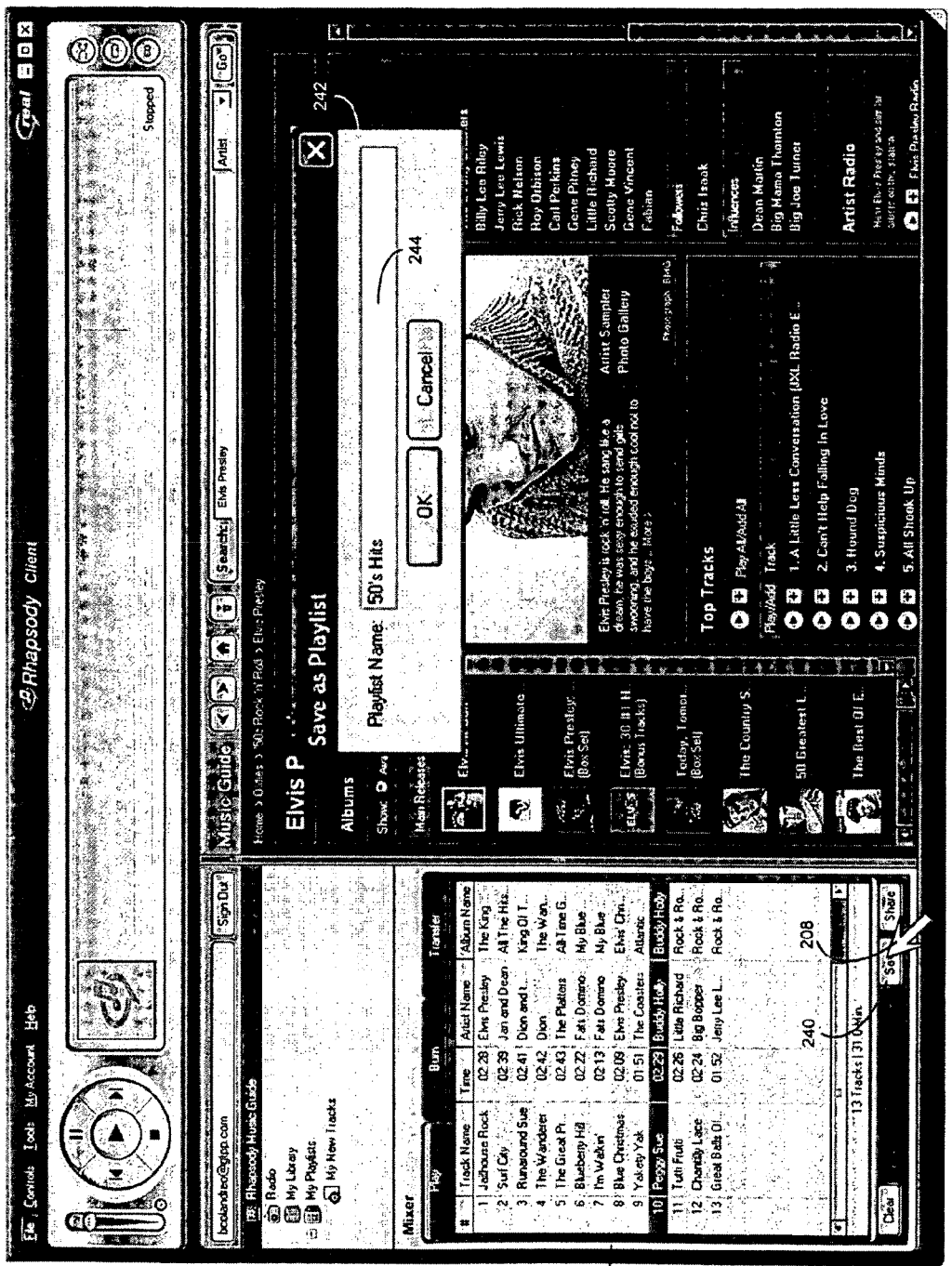
FIG. 6 is a display screen rendered by the client application of FIG. 1.

Referring also to FIG. 6, user 22 may select the "save" button 240 (using screen pointer 208). Once the "save" button 240 is selected, a playlist naming window 242 may be rendered (by client application 46) that allows user 22 to specify a unique name for playlist 102 within the name field 244 of playlist naming window 242.

Assuming that user 22 selects "50's Hits" as a playlist name, playlist 102 is saved (i.e., as "50's Hits") and defines the location of all of the pieces of media content itemized within history window 204.

Figure 7:
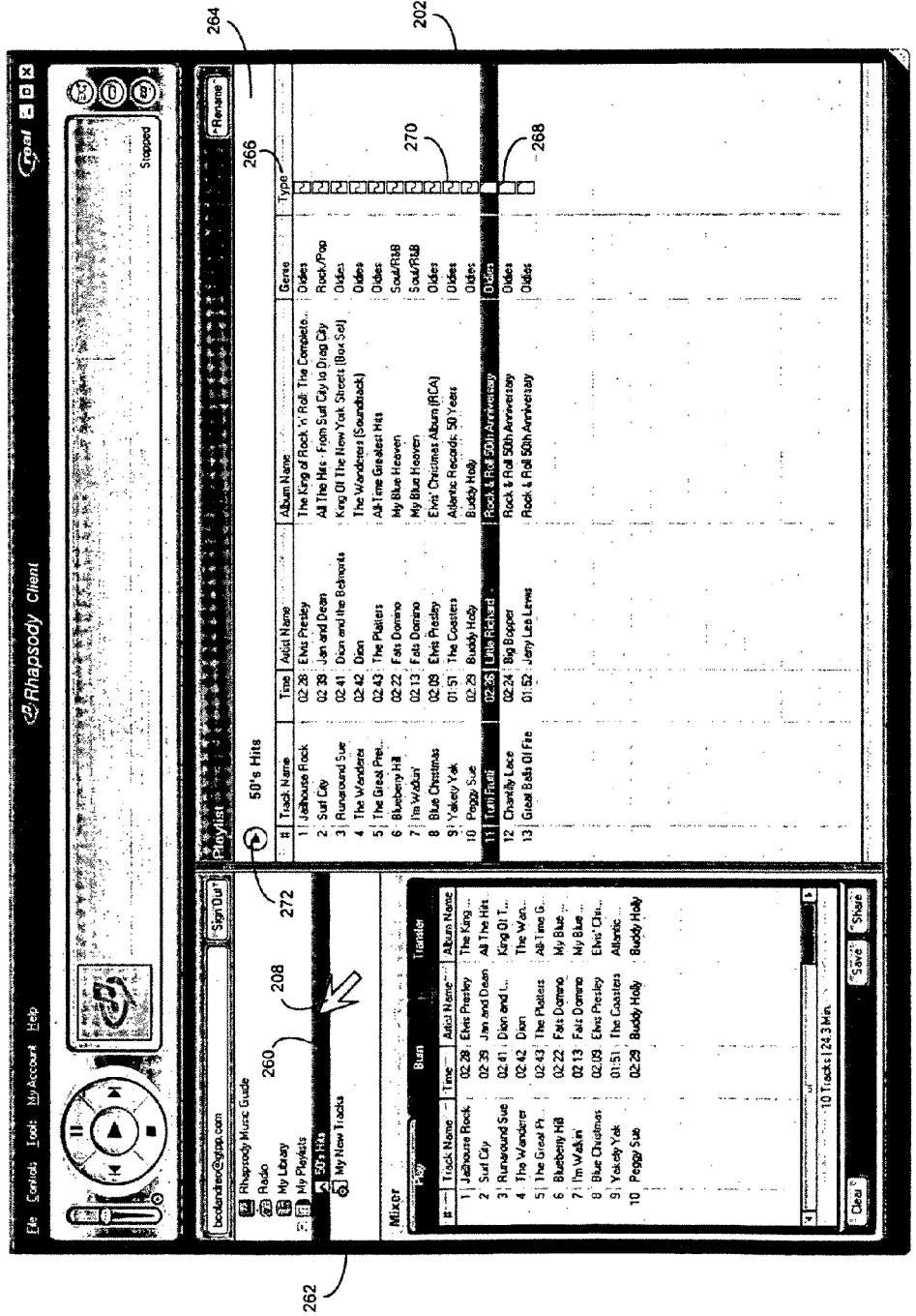
FIG. 7 is a display screen rendered by the client application of FIG. 1.

Referring also to FIG. 7, once playlist 102 is stored, a link 260 to playlist 102 (e.g., "50's Hits") appears in directory window 262. User 22 may then select link 260 using screen pointer 208. Once selected, the tracks included within playlist 102 (e.g., "50's Hits") are itemized within a playlist window 264 (e.g., a web page) viewable via user interface 202. As discussed above, ten of these entries (namely "Jailhouse Rock"; "Surf City"; "Runaround Sue"; "The Wanderer"; "The Great Pretender"; "Blueberry Hill"; "I'm Walkin'"; "Blue Christmas"; "Yakety Yak"; and "Peggy Sue") define the location of media data streams and three of these entries (namely "Tutti Frutti"; "Chantilly Lace"; and "Great Balls of Fire") define the location of media data files.

Typically, playlist window 264 includes hyperlinks that locate (i.e., provide addresses for) the streams/files associated with the individual entries itemized within playlist 102. This location information may be stored within playlist 102. For example, the following table correlates the track name of an entry in playlist 102 with an address for the stream/file associated with that track name:

| Track Name | Address |
| --- | --- |
| Jailhouse Rock | www.musicshop.com\songs\jailhouse_rock.ram |
| Surf City | www.musicshop.com\songs\surf_city.ram |
| Runaround Sue | www.musicshop.com\songs\runaround_sue.ram |
| The Wanderer | www.musicshop.com\songs\the_wanderer.ram |
| The Great Pretender | www.musicshop.com\songs\the_great_pretender.ram |
| Blueberry Hill | www.musicshop.com\songs\blueberry_hill.ram |
| I'm Walkin' | www.musicshop.com\songs\im_walkin.ram |
| Blue Christmas | www.musicshop.com\songs\blue_christmas.ram |
| Yakety Yak | www.musicshop.com\songs\yakety_yak.ram |
| Peggy Sue | www.musicshop.com\songs\peggy_sue.ram |
| Tutti Frutti | c:\my music\tutti_frutti.mp3 |
| Chantilly Lace | c:\my music\chantilly_lace.mp3 |
| Great Balls of Fire | c:\my music\great_balls_of_fire.mp3 |

As the first ten entries (namely "Jailhouse Rock"; "Surf City"; "Runaround Sue"; "The Wanderer"; "The Great Pretender"; "Blueberry Hill"; "I'm Walkin'"; "Blue Christmas"; "Yakety Yak"; and "Peggy Sue") identify media data streams, the address provided for each entry points to a media stream available from e.g., media distribution system 18. Further, as the last three entries (namely "Tutti Frutti"; "Chantilly Lace"; and "Great Balls of Fire") identify media data files, the address provided for each entry points to a media data file available from e.g., client computer 44.

Playlist window 264 is typically tabular and may include a column 266 identifying a media type (i.e., media data stream or media data file, for example) for each entry within playlist window 264. Typically, column 266 includes icons that identify the media type (e.g., icon 268 identifies a media data file and icon 270 identifies a media data stream). User 22 may select the "play" button 272 to render playlist 102.

As discussed above, media distribution system 18 typically provides media data streams and/or media data files to users (e.g., user 22). Typically, metadata is associated with each media data stream provided by media distribution system 18. This metadata may include (but is not limited to) an artist identifier, an album identifier, a track identifier, an album cover image, and a music genre identifier, for example.

Accordingly, whenever e.g., user 12 renders a remote media data stream, media distribution system 18 may compile and save this metadata (on a per-user basis) to track e.g., listening trends and musical preferences of individual users, for example.

As discussed above, a local digital media data file may be a purchased download received from media distribution system 18 (i.e., media content licensed to e.g., user 14 for use in perpetuity); a subscription download received from media distribution system 18 (i.e., media content licensed to e.g., user 14 for use while a valid subscription exists with media distribution system 18); and/or a media data file extracted (i.e., ripped) from e.g., a music compact disc, for example.

If the purchased download and/or the subscription download were provided by media distribution system 18, these local media data files would typically also include the metadata described above. Accordingly, when these purchased/subscription downloads are rendered by e.g., user 22, the metadata concerning these purchased/subscription downloads may be transmitted from computer 44 to computer 28, such that the metadata may be compiled and saved (on a per user basis) to track e.g., listening trends and musical preferences, for example.

However, for media data files that were e.g., extracted from music compact discs, these data files may not include the above-described metadata. As discussed above, media data files (i.e., files stored on client computer 44) may to be rendered using client application 46 and added to playlists (e.g., playlist 102). Accordingly, whenever user 22 attempts to add a media data file (that does not include metadata) to a playlist (e.g., playlist 102), user 22 may be prompted to provide metadata concerning that media data file.

Figure 8:
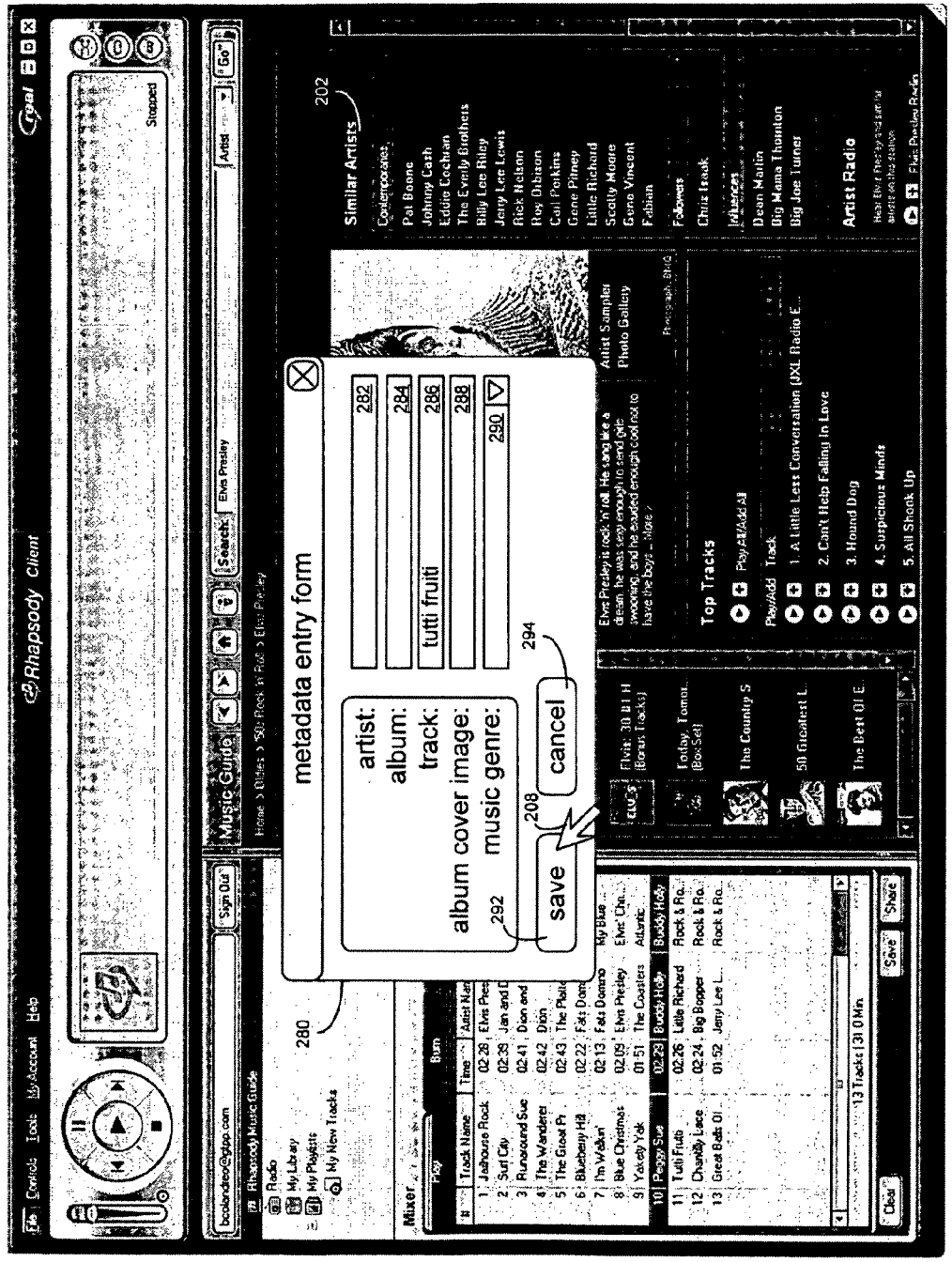
FIG. 8 is a display screen rendered by the client application of FIG. 1.

Referring also to FIG. 8 and continuing with the above-stated example, if user 22 attempts to save a playlist (e.g., playlist 102) that includes three local media data files (namely "Tutti Frutti"; "Chantilly Lace"; and "Great Balls of Fire"), assuming that these three local media data files do not include metadata, client application 46 may render a metadata entry form 280 that allows user 22 to enter metadata concerning each of the three media data files.

In this example, metadata entry form 280 includes five user-editable fields, namely an artist field 282, an album field 284, a track field 286, an album cover image field 288, and a music genre field 290. Album cover image field 288 may allow user 22 to define a drive, a path, and a filename for an album cover image. Music genre field 290 may be a drop-down menu (operable via screen pointer 208) that allows user 22 to select a music genre from a number of predefined music genres (not shown).

Typically, if the title of the media data file is descriptive of the track name, the track field 286 may be automatically-populated with what client application 46 suspects is the track title. As the first local media data file is named "tutti frutti", track field 286 would typically be populated with the suspected name "tutti frutti". User 22 may populate the remaining fields and select the save button 292 (using screen pointer 208) or alternatively select the cancel button 294.

In order to further automate the metadata generation process, client application 44 may interface with a remote metadata database (not shown) served by e.g., media distribution system 18 or a third party (not shown). This metadata database may define metadata for various tracks and albums. An example of such a database is the CDDB™ database maintained by Gracenote™ of Emeryville, Calif. (www.gracenote.com). For example, if user 22 ripped each track from an entire compact disc, the metadata database may be accessed by client application 44 and a query may be structured that defines e.g., the total number of tracks included on the compact disc, the length of each track included on the compact disc, and the total length of the compact disc. Assuming that a definitive result is produced by this query, the metadata for each track ripped from the compact disc would be produced. In the event that an indefinite result set (i.e., one that identifies multiple possible compact discs) is generated, user 22 may be prompted to select the appropriate compact disc from a list of possible matches (not shown).

As discussed above, the type of interface used by the user (when configuring media distribution system 18 for a client electronic device) may vary depending on the type and the capabilities of the client electronic device to which the media content is being streamed/downloaded. Accordingly and as discussed above, media distribution system 18 may be configured for personal media device 12 via proxy application 98 executed on proxy computer 54.

Proxy application 98 may be automatically executed upon personal media device 12 being placed into docking cradle 60 by e.g., user 14. Alternatively, proxy application 98 may be fully or partially loaded upon boot up of proxy computer 54. Proxy application 98 may then operate in the background until personal media device 12 is placed into docking cradle 60, at which time proxy application 98 may be fully loaded and/or moved to the foreground for execution. Further, proxy application 98 may be manually executed by user 14. As will be discussed below in greater detail, proxy application 98 (once executed) may be used to e.g., configure personal media device 12 and transfer media data files to and remove media data files from personal media device 12, for example.

Figure 9:
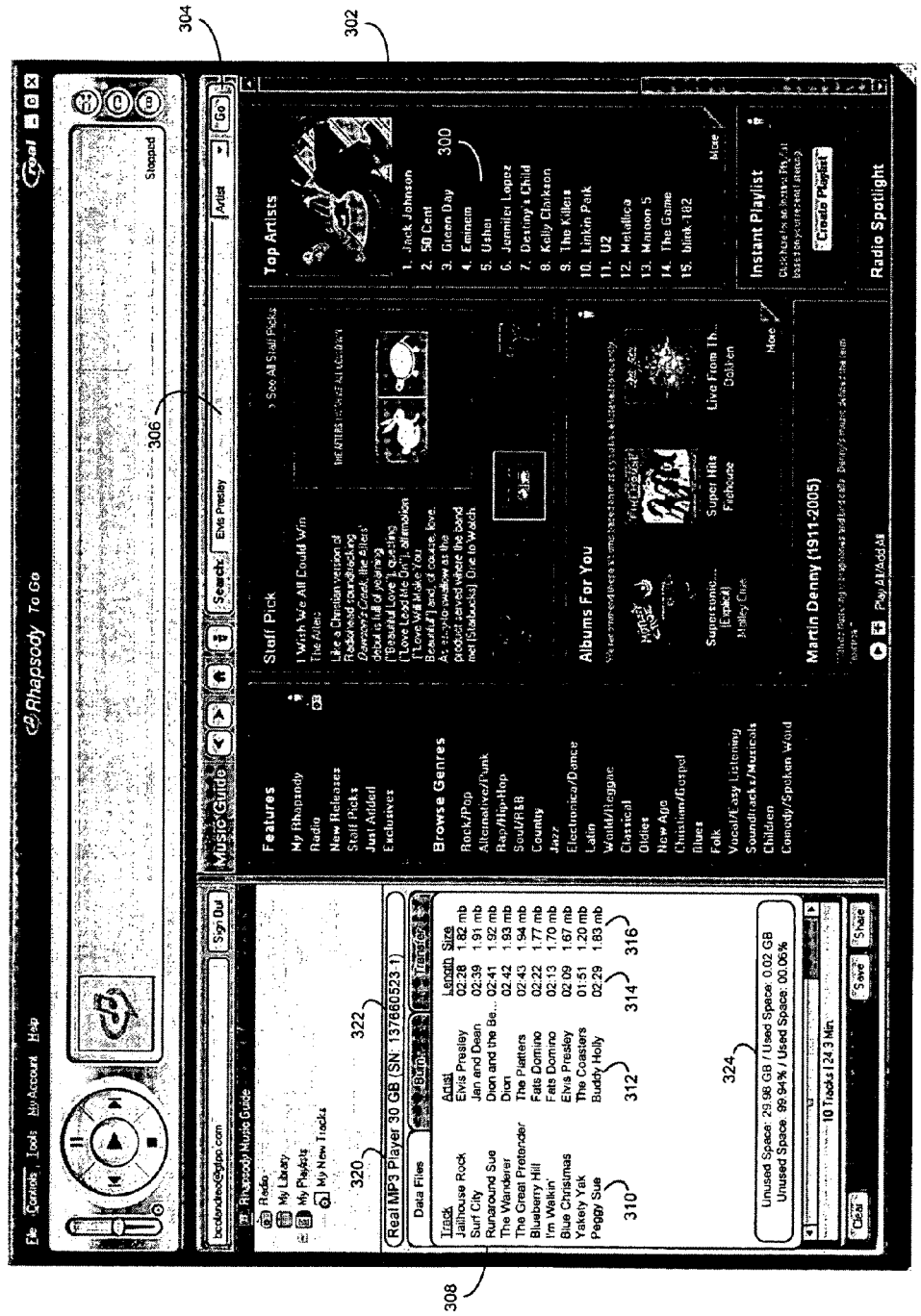
FIG. 9 is a display screen rendered by the proxy application of FIG. 1.

Referring also to FIG. 9, when using proxy application 98 to access media distribution system 18, user 14 may be presented with a information display screen 300 rendered by proxy application 98. Proxy application 98 typically includes a user interface 302 (e.g., a web browser) for interfacing with media distribution system 18 and viewing information display screen 300.

A search window 304 allows a user (e.g., user 14) to search for media content. For example, user 14 may enter search terms (e.g., "Elvis Presley") into search field 306, select the appropriate term type (e.g., artist), and execute a query. In the event that multiple artists satisfy the query, a result set may be generated from which user 14 may select e.g., the appropriate artist. Once the appropriate artist is selected, user 14 may review the various albums released by the selected artist (or that include tracks by the selected artist). User 14 may then download (for use on personal media device 12) one or more of the various tracks included within any of the albums. In addition to being able to search for media content by artist, user 14 may also be able to search for media content by e.g., keyword, track, album and/or composer.

Additionally, in a fashion similar to that of client application 46, proxy application 98 may be configured to allow user 12 to render (via proxy computer 54) one or more of the various tracks included within any of the albums of the selected artist.

A content window 308 may be rendered by proxy application 98 that allows user 14 to review the contents of personal media device 12. As discussed above, personal media device 12 may be coupled to proxy computer 54 via e.g., a USB port, serial port, or FireWire port. Upon or during execution of proxy application 98, proxy application 98 may poll personal media device 12 to retrieve information concerning the media content currently on device 12. This polling may occur in a fashion similar to the manner in which the content of a USB hard drive is determined. In this particular example, content window 308 includes ten (10) entries, namely: "Jailhouse Rock"; "Surf City"; "Runaround Sue"; "The Wanderer"; "The Great Pretender"; "Blueberry Hill"; "I'm Walkin'"; "Blue Christmas"; "Yakety Yak"; and "Peggy Sue", thus indicating that ten (10) media data files had been previously downloaded to personal media device 12, which are typically stored on storage device 66 of personal media device 12.

Content window 308 may be tabular and itemize various pieces of information concerning the downloaded files, including the track 310, the artist 312, the track length 314 and the track size 316. Additionally, proxy application 98 my poll personal media device 14 to retrieve device identification information, which may be rendered within a device type field 320 and a device serial number field 322 included within content window 308. Further, content window 308 may include a summary information field 324 concerning the current capacity of device 12, including one or more of e.g., "Unused Space" in gigabytes; "Used Space" in gigabytes; "Unused Space" in percentage of total capacity; and "Used Space" in percentage of total capacity, for example.

Figure 10:
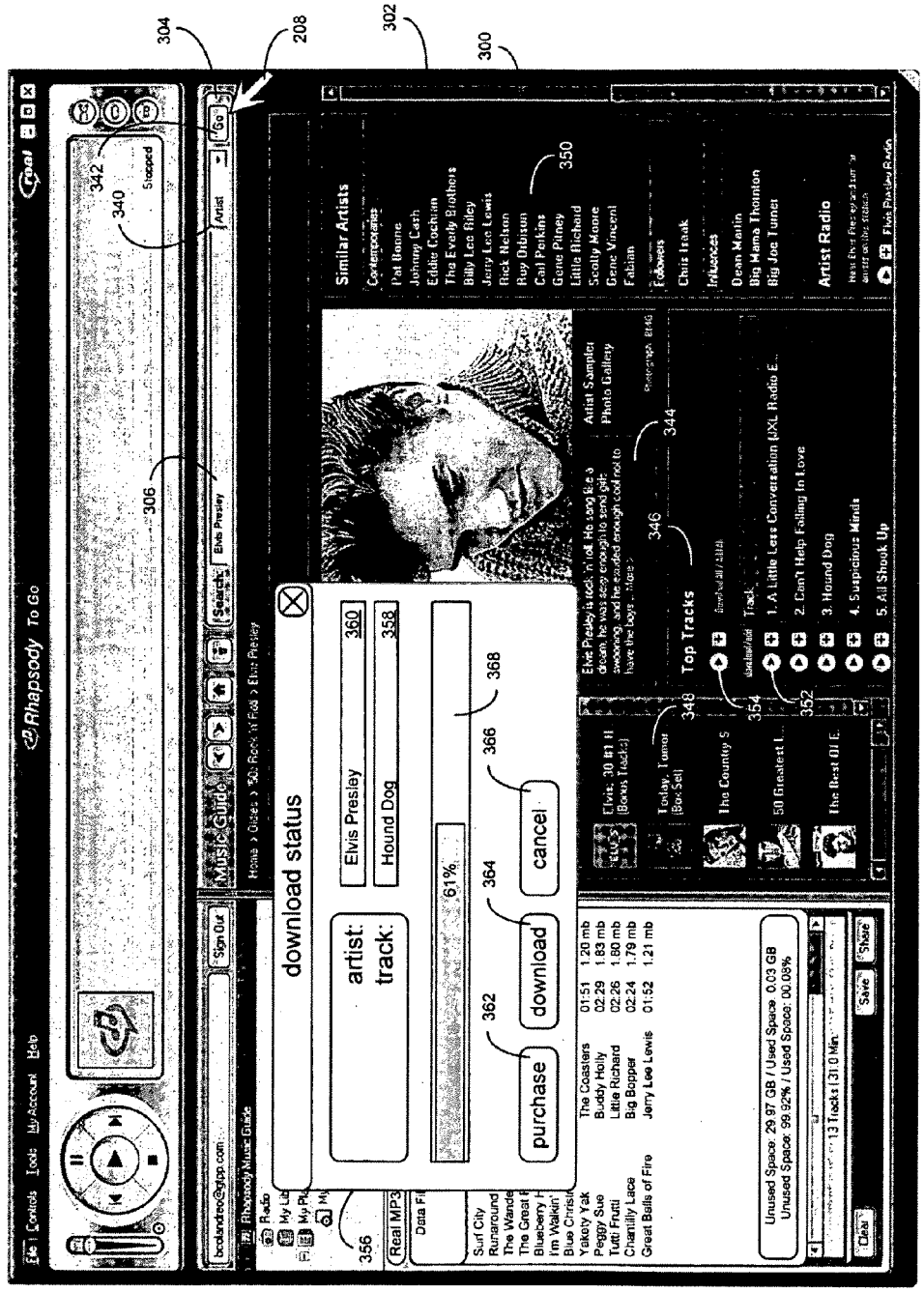
FIG. 10 is a display screen rendered by the proxy application of FIG. 1.

Referring also to FIG. 10 and continuing with the above-stated example, assume that user 14 enters the search term "Elvis Presley" into search field 306 of search window 304, selects the term type "artist" via dropdown menu 340, and executes the query by selecting the "Go" button 342 with screen pointer 208.

Assuming that no other artist satisfies the query, information screen 300 may be presented to user 14 with information concerning Elvis Presley, which may include: an artist information screen 344, a top track list 346, an album list 348, and a similar artist list 350, for example.

User 14 may download media data files from media distribution system 18 for use on personal media device 12 by selecting the download button 352 corresponding to the track to be downloaded. Additionally, user 14 may download groups of tracks (e.g., each track included within top track list 346, or all tracks included within an single album) by selecting the download all button 354 corresponding to the tracks to be downloaded.

Once user 14 selects a track for downloading, proxy application 98 may render a download window 356 that e.g., includes a track title field 358 that identifies the title of the track being downloaded and an artist field 360 that identifies the artist of the track being downloaded.

As discussed above, files may be downloaded from media distribution system 18 as purchased downloads (i.e., media content licensed to e.g., user 14 for use in perpetuity), or subscription downloads (i.e., media content licensed to e.g., user 14 for use while a valid subscription exists with media distribution system 18). Provided user 14 has a current subscription with media distribution system 18, there is typically no additional fee charged for each subscription download, as the downloaded media content is only renderable while the user has a valid subscription. However, a user typically must pay a fee (e.g., 79¢, 89¢, or 99¢, for example) for each purchased download, as the media content is renderable regardless of the status of the user's subscription.

Accordingly, download window 356 may include a purchase button 362 and a download button 364, both of which are selectable via screen pointer 208. In this example, if user 14 selects purchase button 362 with screen pointer 208, a media data file for "Hound Dog" by "Elvis Presley" will be transferred from computer 28 to personal media device 12. Typically, user 14 will be charged e.g., a one-time download fee for downloading this media data file. However, as this is a purchased download, the media data file received is renderable regardless of the status of the user's subscription with media distribution system 18.

Alternatively, if user 14 selects download button 364 with screen pointer 208, a media data file for "Hound Dog" by "Elvis Presley" will be transferred from computer 28 to personal media device 12. Typically, user 14 will not be charged a fee for downloading this media data file. However, as this is a subscription download, the media data file received is only renderable while user 14 has a valid subscription with media distribution system 18.

Download window 356 typically also includes a cancel button 366 for allowing user 14 to cancel the download and close download window 356.

If user 14 selects either purchase button 362 or download button 364, the download of the selected media data file will be initiated. Download window 356 may include a download status indicator 368 for indicating the progress of the download of e.g., "Hound Dog" by "Elvis Presley".

Figure 11:
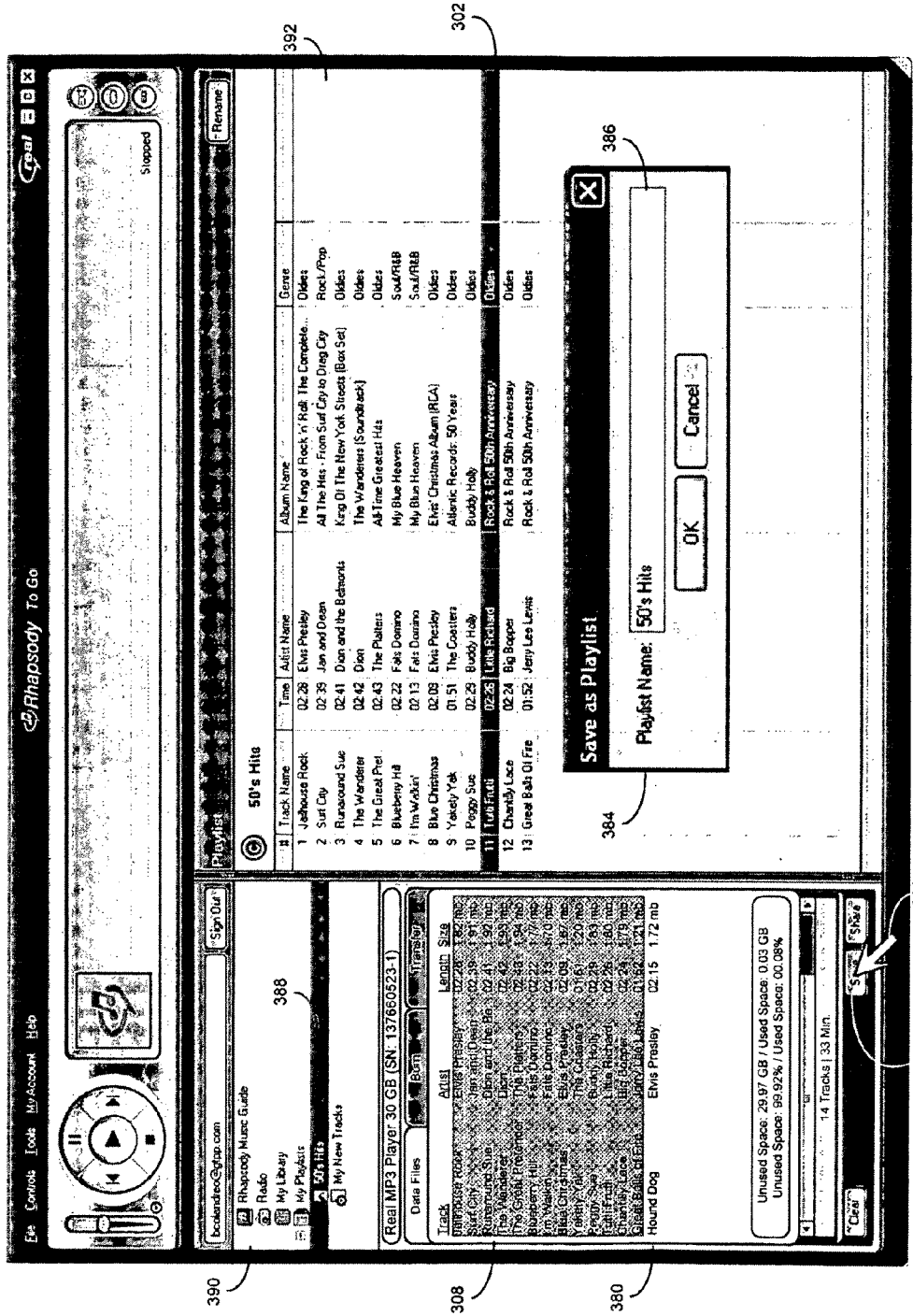
FIG. 11 is a display screen rendered by the proxy application of FIG. 1.

Referring also to FIG. 11, once the download of the media data file for "Hound Dog" by "Elvis Presley" is completed, content window 308 will be updated to include an entry 380 for "Hound Dog" by "Elvis Presley", indicating that "Hound Dog" by "Elvis Presley" was successfully downloaded from media distribution system 18 to personal media device 12.

In a fashion similar to that described above concerning client application 46, user 14 may use proxy application 98 to define playlists concerning various media data files stored on personal media device 12. For example, assume that user 14 wished to save the first thirteen tracks (namely "Jailhouse Rock"; "Surf City"; "Runaround Sue"; "The Wanderer"; "The Great Pretender"; "Blueberry Hill"; "I'm Walkin'"; "Blue Christmas"; "Yakety Yak"; "Peggy Sue"; "Tutti Frutti"; "Chantilly Lace"; and "Great Balls of Fire") as a playlist, user 14 would highlight the desired selection of tracks (using screen pointer 208) and select the save button 382 using screen pointer 208. A playlist naming window 384 may be rendered (by proxy application 98) that allows user 14 to specify a unique name for the playlist within the name field 386 of playlist naming window 384.

Assuming that user 14 selects "50's Hits" as a playlist name, playlist 104 (FIG. 1) named "50's Hits" may be defined that locates (within personal media device 12) all of the pieces of media content itemized within playlist 104. Once playlist 104 is stored, a link 388 to playlist 104 (e.g., "50's Hits") appears in directory window 390. User 14 may then select link 388 using screen pointer 208.

Once selected, the tracks included within playlist 104 (e.g., "50's Hits") are typically itemized within a playlist window 392 (e.g., a web page) viewable via user interface 302.

As with the playlists described above as being generated using client application 44, playlists generated using proxy application 98 are typically maintained locally (e.g., maintained on personal media device 12). However and as discussed above, playlists may alternatively/additionally be maintained remotely (e.g., maintained on computer 28) as remote playlist 104'.

Device Initialization:

Media distribution system 18 is typically a subscription-based service, in that e.g., user 14 subscribes to media distribution system 18 and pays e.g., a monthly subscription fee to be granted access to media distribution system 18. Once user 14 subscribes to media distribution system 18, user 14 may obtain media content (for use with personal media device 12) in the form of: purchased downloads received from media distribution system 18 (i.e., media content licensed to e.g., user 14 for use in perpetuity); subscription downloads received from media distribution system 18 (i.e., media content licensed to e.g., user 14 for use while a valid subscription exists with media distribution system 18); and media content streamed from media distribution system 18, for example. Typically, when accessing media distribution system 18, user 14 must provide user "credentials" that identify the user (e.g., user 14) and/or the device (e.g., device 12) to media distribution system 18. Upon receiving these credentials, media distribution system 18 may attempt to verify the credentials and, if verified, grant user 14 and/or device 12 access to media distribution system 18. The credentials received and verified by media distribution system 18 may include, but are not limited to, a user name, a user password, a user key, a device name, a device password, a device key, and/or one or more digital certificates.

Typically, upon personal media device 12 being placed into docking cradle 60, personal media device 12 establishes a connection with media distribution system 18 via proxy computer 54. As discussed above, proxy computer 54 may function as an Internet gateway for personal media device 12 and, therefore, allow personal media device 12 to access computer 28 and media distribution system 18.

Once a connection is establish with, media distribution system 18, DRM process 10 may be initiated. DRM process 10 is typically executed at the time personal media device 12 is initially configured (i.e., the first time personal media device 12 establishes a connection with media distribution system 18). As will be discussed below in greater detail, DRM process 10 may be systematically and repeatedly executed to verify that device 12 (and/or user 14) are active subscribers of media distribution system 18.

Figure 12A:
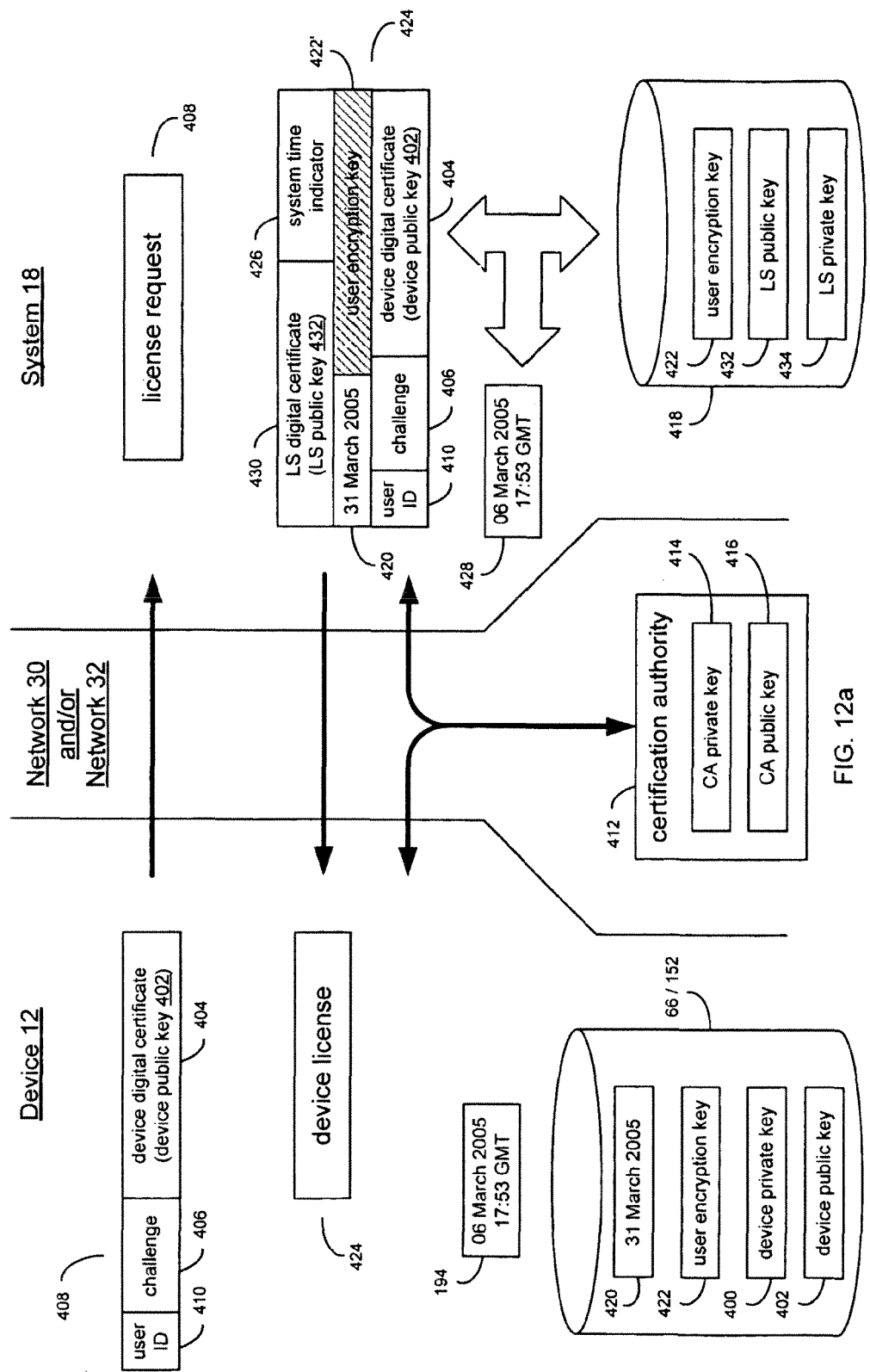
FIG. 12a is a diagrammatic view of the media distribution system, personal media device, and distributed computing network of FIG. 1.
Figure 12B:
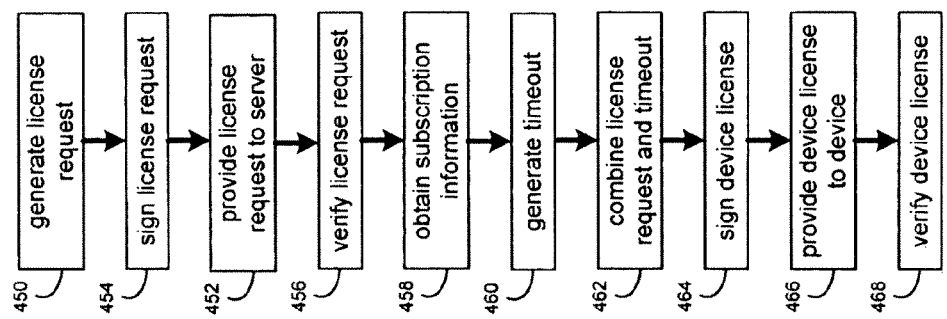
FIG. 12b is a flowchart of a process executed by the DRM process of FIG. 1.

Referring also to FIGS. 12*a* & 12*b*, at the time of manufacture, personal media device 12 may include a private encryption key (e.g., device private key 400) and a public encryption key (e.g., device public key 402) stored in non-volatile memory (e.g., ROM 152 and/or storage device 66). Keys 400, 402 may be 1024-bit asymmetric encryption keys and may be referred to as DRM (i.e., digital rights management) keys.

As is known in the art, a private key/public key encryption methodology allows users of an unsecure network (e.g., the Internet) to securely exchange data through the use of a pair of encryption keys, namely the private encryption key (e.g., device private key 400) and the public encryption key (e.g., device public key 402). The private key/public key encryption methodology is typically referred to as an asymmetric encryption methodology, in that the key used to encrypt a message is different than the key used to decrypt the message.

In private key/public key encryption, the private encryption key (e.g., device private key 400) and the public encryption key (e.g., device public key 402) are typically created simultaneously using the same algorithm (e.g., the RSA algorithm created by Ron Rivest, Adi Shamir, and Leonard Adlemana, for example). Device private key 400 is typically given only to the requesting party and device public key 402 is typically made publicly available (e.g., as part of digital certificate 404). Typically, device private key 400 is not shared and is maintained securely within e.g., personal media device 12.

Accordingly, when a secure message is to be sent from a sender to a recipient, the public key (e.g., device public key 402) of the recipient (which is readily accessible to the sender) is used to encrypt the message. Once encrypted, the message may be sent to the recipient and can only be decrypted using the recipient's private key (e.g., device private key 400). As private key 400 is maintained securely by the recipient, only the recipient can decrypt the encrypted message.

In addition to encrypting and decrypting messages, a sender may authenticate their identity by using their private key (e.g., device private key 400) to encrypt a digital certificate, which is then sent to a recipient (i.e., the person to which they are authenticating their identity). Accordingly, when the digital certificate is received by the recipient, the recipient can decrypt the encrypted digital certificate using the sender's public key (e.g., device public key 402), thus verifying that the digital certificate was encrypted using the sender's private key (e.g., device private key 400) and, therefore, verifying the identity of the sender.

DRM process 10 may generate a challenge 406, which is typically a random number generated by a random number generation process (not shown) included within personal media device 12. Once generated, challenge 406 may be paired with device digital certificate 404 (which typically includes device public key 402) to generate 450 a license request 408. Device digital certificate 404, which may be referred to as a DRM digital certificate, may include additional information such as a device serial number (e.g., 137660523-1 from device serial number field 322, FIG. 9), for example.

As discussed above, proxy application 98 allows the owner of device 12 (e.g., user 14) to: configure device 12 for use with media distribution system 18; and configure media distribution system 18 for use with device 12. Typically, when proxy application 98 is configured on proxy computer 54, user 14 may be required to provide user credentials that identify the user (e.g., user 14) and define a valid subscription that would allow user 14, device 12, and proxy application 98 to access media distribution system 18. Alternatively or additionally, personal media device 12 may be configured to allow the user (e.g., user 14) to directly enter the user credentials (via device 12) when device 12 is initially configured.

DRM process 10 may provide 452 license request 408 (via network 30 and/or network 32) to media distribution system 18. Additionally, if defined within personal media device 12, a user ID 410 (e.g., enumerating the user credentials described above) may also be included within license request 408. As discussed above, the user credentials (i.e., included within user ID 410) may include, but are not limited to, a user name, a user password, a user key, a device name, a device password, a device key, and/or one or more digital certificates. Prior to being provided 452 to media distribution system 18, DRM process 10 may digitally sign 454 license request 408 using device private key 400.

A digital signature is an electronic signature that uses the private key/public key encryption methodology (described above) and allows a sender of a message to authenticate their identity and the integrity of message sent. A digital signature may be used with both encrypted and non-encrypted messages and does not impede the ability of the receiver of the message to read the message.

For example, assume that DRM process 10 digitally signed 454 license request 408 prior to providing 452 license request 408 to media distribution system 18. When digitally signing 454 license request 408, a mathematical function is typically performed on the content of license request 408. For example, a message hash of license request 408 may be calculated by personal media device 12, such that a message hash is the mathematical output of a known one-way hash function that transforms a string of characters (e.g., license request 408) into a usually shorter fixed-length value that represents the original string of characters. As the hashing function is a one-way mathematical function, once a message hash is generated, the original message cannot be retrieved by processing the message hash. DRM process 10 may then encrypt the message hash (using device private key 400) to create the digital signature (not shown). This digital signature may then be attached to license request 408. Accordingly, while the digital signature is encrypted, the original message (i.e., license request 408) need not be. Therefore, license request 408 may be processed by media distribution system 18 even if the digital signature is not processed.

Continuing with the above-stated example, license request 408 and the digital signature may be received by media distribution system 18, and media distribution system 18 may use the same hash function to generate a message hash of license request 408. Media distribution system 408 will also decrypt the digital signature received from personal media device 12 using device public key 402 (included within device digital certificate 404) to recreate the message hash calculated by personal media device 12. Media distribution system 18 may then compare the decrypted digital signature to the message hash calculated by the media distribution system 408. If the message hashes match, the integrity of license request 408 and the identity of personal media device 12 are both verified 456.

Additionally, the integrity of device digital certificate 404 (and, therefore, device public key 402) may be verified when license request 408 is received from personal media device 12. Digital certificates are typically issued and digitally signed by e.g., certification authority 412 using CA private key 414. Accordingly, device digital certificate 404 may be verified by obtaining the CA public key 416 to verify the digital signature of device digital certificate 404.

Once challenge 406, device digital certificate 404, and user ID 410 (i.e., license request 408) are received by media distribution system 18, media distribution system 18 may access data store 418 to obtain 458 subscription information concerning user 14 (i.e., the user defined within user ID 410) and determine e.g., the date at which the current subscription of user 14 will expire. Data store 418 may be maintained on storage device 34 coupled to computer 28.

Assume, for illustrative purposes, that media distribution system 18 is configured to automatically bill each subscriber on the first of each month for the subscription fee for the upcoming month. Accordingly, on 1 Mar. 2005, user 14 will be billed for the cost of their March 2005 subscription. Therefore, if media distribution system 18 obtains 458 subscription information concerning user 14 on 6 Mar. 2005, the subscription information obtained 458 will indicate that user 14 has a valid subscription until 31 Mar. 2005.

Accordingly and continuing with the above-stated example, when license request 408 is received, media distribution system 18 may obtain 458 subscription information concerning user 14. In this example, the subscription information will indicate that user 14 is a valid subscriber (to media distribution system 18) through 31 Mar. 2005.

Media distribution system 18 may generate 460 a timeout indicator 420, which indicates e.g., the user's subscription information and the expiration date of the user's current subscription. In this example, timeout indicator 420 will indicate that e.g., the subscription of user 14 will expire on 31 Mar. 2005. Media distribution system 18 may obtain user encryption key 422 (i.e., the encryption key for user 14) from data store 418. Media distribution system 18 may then encrypt user encryption key 422, using device public key 402, to generate encrypted user encryption key 422' (shown with a hash fill). Timeout indicator 420, challenge 406, device digital certificate 404 (including device public key 402), user ID 410, and encrypted user encryption key 422' may be combined 462 (by media distribution system 18) to form device license 424.

Device license 424 may further include a system time indicator 426, which indicates the system time as defined by media distribution system 18. System time indicator 426 may be used to synchronize a system clock 194 (FIG. 3) included within personal media device 12 with a system clock 428 included within media distribution system 18.

Device license 424 may further include a licensing service (i.e., LS) digital certificate 430, which typically includes a licensing service (i.e., LS) public key 432.

Media distribution system 18 may digitally sign 464 device license 424 using licensing service (i.e., LS) private key 434 (of media distribution system 18) and provide 466 device license 424 to personal media device 12. Licensing system private key 434 may be stored on data store 418.

When device license 424 is received from media distribution system 18, DRM process 10 may verify the integrity of LS digital certificate 430 (and, therefore, LS public key 432). As discussed above, digital certificates are typically issued and digitally signed by e.g., certification authority 412 using CA private key 414. Accordingly, LS digital certificate 430 may be verified by obtaining the CA public key 416 to verify the digital signature of LS digital certificate 430.

DRM process 10 may use LS public key 432 (included within LS digital certificate 430) to verify 468 device license 424 (which was digitally signed using LS private key 434). DRM process 10 may additionally verify challenge value 406, device public key 402, and the device serial number (included within device digital certificate 404) to ensure that device license 424 is intended for personal media device 12. DRM process 10 may then decrypt, with device private key 400, encrypted user encryption key 422' (that was encrypted using device public key 402) to generate user encryption key 422, which may be stored in non-volatile memory, examples of which may include ROM 152 (FIG. 3) and/or storage device 66 (FIG. 3). User ID 410, user encryption key 422, and timeout indicator 420 may be saved on e.g., non-volatile memory, examples of which include ROM 152 (FIG. 3) and/or storage device 66 (FIG. 3), for use when personal media device 12 renders media content downloaded from media distribution system 18. Additionally, as will discussed below in greater detail, DRM process 10 may retain a copy of device license 424 for use when transferring media content between personal media device 12 and e.g., personal media device 40.

Obtaining Media Content:

As discussed above, once user 14 subscribes to media distribution system 18, user 14 may obtain from media distribution system 18 media content (for use with personal media device 12) in the form of: purchased downloads received from media distribution system 18 (i.e., media content licensed to e.g., user 14 for use in perpetuity); subscription downloads received from media distribution system 18 (i.e., media content licensed to e.g., user 14 for use while a valid subscription exists with media distribution system 18); and media content streamed from media distribution system 18, for example.

Figure 13A:
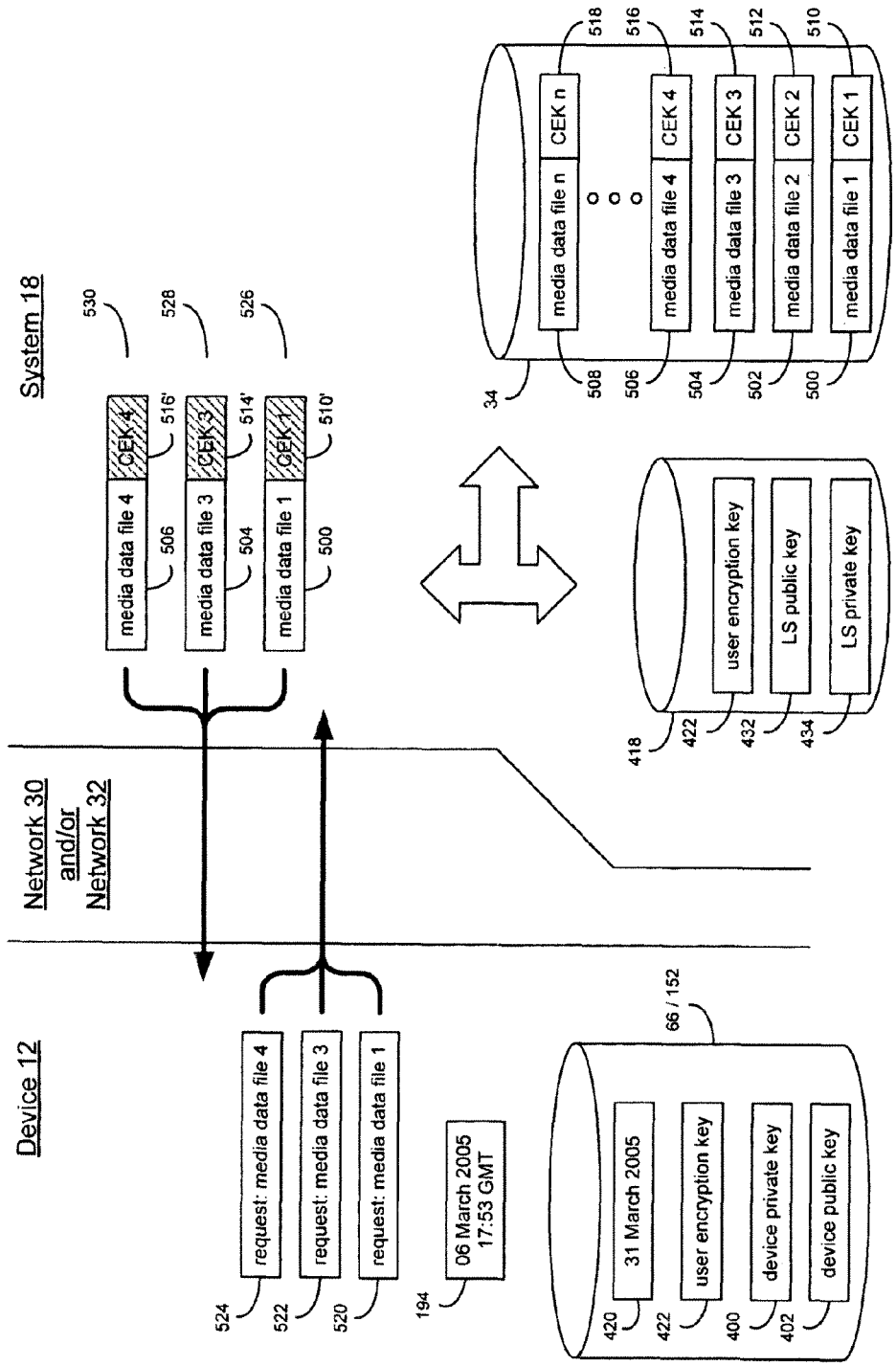
FIG. 13a is a diagrammatic view of the media distribution system, personal media device, and distributed computing network of FIG. 1.
Figure 13B:
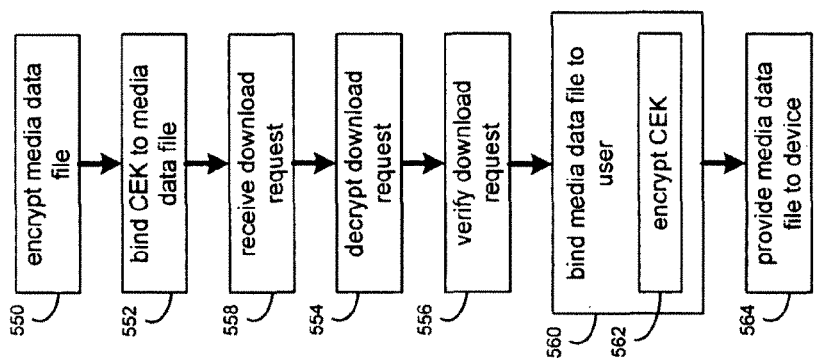
FIG. 13b is a flowchart of a process executed by the DRM process of FIG. 1.

Referring also to FIGS. 13a & 13b, each media data file 500, 502, 504, 506, 508 downloadable from media distribution system 18 may be encrypted 550 using a unique CEK (i.e., content encryption key) 510, 512, 514, 516, 518 respectively. For example, if media distribution system 18 includes 1,000,000 media data files available for downloading to e.g., personal media device 12, media distribution system 18 will encrypt 550 each media data file using a unique encryption key. Accordingly, for 1,000,000 media data files, 1,000,000 unique CEK's will be required, each of which is bound 552 to the media data file to which the CEK is related. Accordingly, CEK 510 may be bound 552 to media data file 500, and CEK 512 may be bound 552 to media data file 502, for example.

Each CEK (e.g., keys 510, 512, 514, 516, 518) may be a symmetric encryption key, in that the key used to encrypt a media data file may also be used to decrypt the same media data file. Typically, each media data file may be stored on e.g., storage device 34 attached to computer 28.

As discussed above, search window 304 (FIG. 10) of proxy application 98, may allow user 14 to search for media data files. Additionally, user 14 may download media data files from media distribution system 18 for use on personal media device 12 by selecting the download button 352 (FIG. 10) corresponding to the media data file to be downloaded.

Once the download of a media data file is initiated, personal media device 12 may submit the appropriate download request(s) to media distribution system 18. For example, assume that user 14 wished to download three media data files, namely media data files 500, 504, 506. DRM process 10 would submit download requests 520, 522, 524 respectively, each of which requests the desired file. For security and authentication purposes, download requests 520, 522, 524 may be e.g., encrypted by personal media device 12 (using e.g., LS public key 432) and/or digitally signed by personal media device 12 (using e.g., device private key 400). Accordingly, if a download request is encrypted (using e.g., LS public key 432), the encrypted download request may subsequently be decrypted 554 by media distribution system 18 using LS private key 434. Further, if a download request is digitally signed (using e.g., device private key 400), the signed download request may subsequently be verified 556 by media distribution system 18 using device public key 402.

Once e.g., download requests 520, 522, 524 are received 558 and processed 554, 556 by media distribution system 18, media distribution system 18 may retrieve the requested media data files 500, 504, 506 from e.g., storage device 34. As discussed above, each media data file is currently encrypted using a unique CEK, such that the CEK is bound to the media data file.

Prior to being downloaded to personal media device 12, each media data file to be downloaded may be bound 560 to the user (e.g., user 14) who requested the download. As discussed above, during device initialization, personal media device 12 provides license request 408 to media distribution system 18. Media distribution system 18 in turn processes license request 408 and obtains current subscription information concerning the user associated with license request 408 (e.g., user 14). As discussed above, this initialization process may occur periodically and, therefore, may occur at the time that personal media device 12 is placed into docking cradle 60 (FIG. 2). Accordingly and for this example, assume that personal media device 12 has provided the required user credentials to properly access media distribution system 18. As discussed above, the user credentials provided to media distribution system 18 may include, but are not limited to, a user name, a user password, a user key, a device name, a device password, a device key, and/or one or more digital certificates.

Once media distribution system 18 retrieves the requested media data files 500, 504, 506 from e.g., storage device 34, media distribution system 18 binds 560 the retrieved media distribution files 500, 504, 506 to user 14 e.g., the user requesting the media data files, thus creating bound media data files 526, 528, 530. Accordingly, the content encryption key (e.g., CEK 510) associated with each media data file (e.g., media data file 500) may be encrypted 562 using the encryption key (e.g., user encryption key 422) of the user requesting the media data files (e.g., user 14). Accordingly, CEK 510 may be encrypted 562 to generate CEK 510', CEK 514 may be encrypted 562 to generate CEK 514', and CEK 516 may be encrypted 562 to generate CEK 516'. Once encrypted 562, bound media data files 526, 528, 530 (including encrypted CEK's 510', 514', 516' respectively) may be provided 564 to personal media device 12.

As the CEK of each bound media data file 526, 528, 530 may be encrypted 562 using e.g., user encryption key 422, bound media data files 526, 528, 530 may only be processed (e.g., rendered) by a personal media device in possession of user encryption key 422. As discussed above, a copy of user encryption key 422 may be stored on non-volatile memory within personal media device 12. Once bound media data files 526, 528, 530 are received by personal media device 12, files 526, 528, 530 may be stored on e.g., storage device 66 within personal media device 12.

Media Content Playback:

As discussed above, user ID 410, user encryption key 422, and timeout indicator 420 may be saved for use when personal media device 12 renders media content downloaded from media distribution system 18.

Continuing with the above-stated example, if user 14 wishes to render one of bound media data files 526, 528, 530, user 14 may select the appropriate media data file via the controls (e.g., backward skip switch 78 (FIG. 3); forward skip switch 80 (FIG. 3); play/pause switch 82 (FIG. 3); menu switch 84 (FIG. 3); radio switch 86 (FIG. 3); and slider assembly 88 (FIG. 3), for example) and display panel 90 (FIG. 3) of personal media device 12. Once one or more media data files are selected for playback, the appropriate file(s) are retrieved from e.g., storage device 66. As discussed above, prior to each media data file being provided to personal media device 12, the CEK of each media data file may be encrypted (by media distribution system 18) using user encryption key 422. As discussed above, user encryption key 422 may be a symmetric encryption key and, therefore, the key used to e.g., encrypt CEK 510 may also be used to decrypt encrypted CEK 510'.

Once the appropriate bound media data files are retrieved from e.g., storage device 66, DRM process 10 may decrypt the appropriate CEK (using user encryption key 422) so that the media data file can be processed and rendered on personal media device 12. For example, if user 14 wished to render bound media data files 526, 528, personal media device 12 would decrypt encrypted CEK 510' to generate CEK 510. CEK 510 may then be used by DRM process 10 to decrypt media data file 500 for playback by personal media device 12. Further, DRM process 10 would decrypt encrypted CEK 514' to generate CEK 514. CEK 514 may then be used by DRM process 10 to decrypt media data file 504 for playback by personal media device 12.

Typically, prior to processing and rendering e.g., bound media data files 526, 528, DRM process 10 will verify that e.g., user 14 has sufficient rights to process and render the bound media data files.

As discussed above, media distribution system 18 is typically a subscription-based service, in that e.g., user 14 subscribes to media distribution system 18 and pays e.g., a monthly subscription fee to be granted access to media distribution system 18. Further, user 14 may obtain from media distribution system 18 subscription downloads that allow user 14 to process and playback the subscription downloads only while a valid subscription exists with media distribution system 18.

Assuming that bound media data files 526, 528, 530 are subscription downloads (as opposed to purchased downloads that are licensed in perpetuity for use by user 14), prior to rendering and/or processing bound media data files 526, 528, 530, DRM process 10 may obtain timeout indicator 420, which as discussed above may be stored on e.g., non-volatile memory, examples of which include ROM 152 (FIG. 3) and/or storage device 66 (FIG. 3). DRM process 10 may then compare the expiration date (e.g., 31 Mar. 2005) defined within timeout indicator 420 to the date and/or time defined within system clock 194 to determine if e.g., user 14 is still allowed to render bound media data files 526, 528, 530. In this example, as user 14 has a valid subscription through 31 Mar. 2005 and the current date and time (as defined by system clock 194) is 17:53 GMT on 6 Mar. 2005, the subscription of user 14 (with respect to media distribution system 18) is valid and current. Accordingly, bound media data files 526, 528, 530 may be processed for playback.

As discussed above, DRM process 10 may be systematically and repeatedly executed to verify that device 12 (and/or user 14) are active subscribers of media distribution system 18. For example, DRM process 10 may be executed each time that personal media device 12 is placed into docking cradle 60. DRM process 10 may provide 452 license request 408 (via network 30 and/or network 32) to media distribution system 18. Upon receiving license request 408, media distribution system 18 may obtain 458 subscription information concerning user 14, including timeout indicator 420.

As discussed above, media distribution system 18 may be configured to automatically bill each subscriber on the first of each month for the subscription fee for the upcoming month. Accordingly, each time that personal media device 12 is placed into docking cradle 60, updated subscription information (e.g., a timeout indicator) may be obtained from media distribution system 18. Therefore, provided user 14 continues to pay their e.g., monthly subscription fees, personal media device 12 will continue to be systematically updated to include the current timeout indicator.

However, in this example, the subscription information (e.g., the timeout indicator) is only updated when personal media device 12 is placed into cradle 60. Accordingly, even if user 14 continues to pay their e.g., monthly subscriptions fees, if personal media device 12 is not placed into cradle 60 prior to e.g., 31 Mar. 2005 (i.e., the date of the current timeout indicator), personal media device 12 may be prohibited from rendering media data files after 31 Mar. 2005 even if user 14 has a valid and current subscription (as personal media device 12 will be unable to obtain an undated timeout indicator.

Device-to-Device Media Content Transfer:

As discussed above, media distribution system 18 is typically a subscription-based service, in that e.g., user 14 subscribes to media distribution system 18 and pays e.g., a monthly subscription fee to be granted access to media distribution system 18. Further, user 14 may obtain from media distribution system 18 subscription downloads that allow user 14 to process and playback the subscription downloads only while a valid subscription exists with media distribution system 18. Accordingly, since the rights associated with a subscription download are based upon the existence of a valid subscription with media distribution system 18, subscription downloads may be transferred from a first personal media device to a second media device, as long as a valid subscription exists concerning the second personal media device.

Figure 14A:
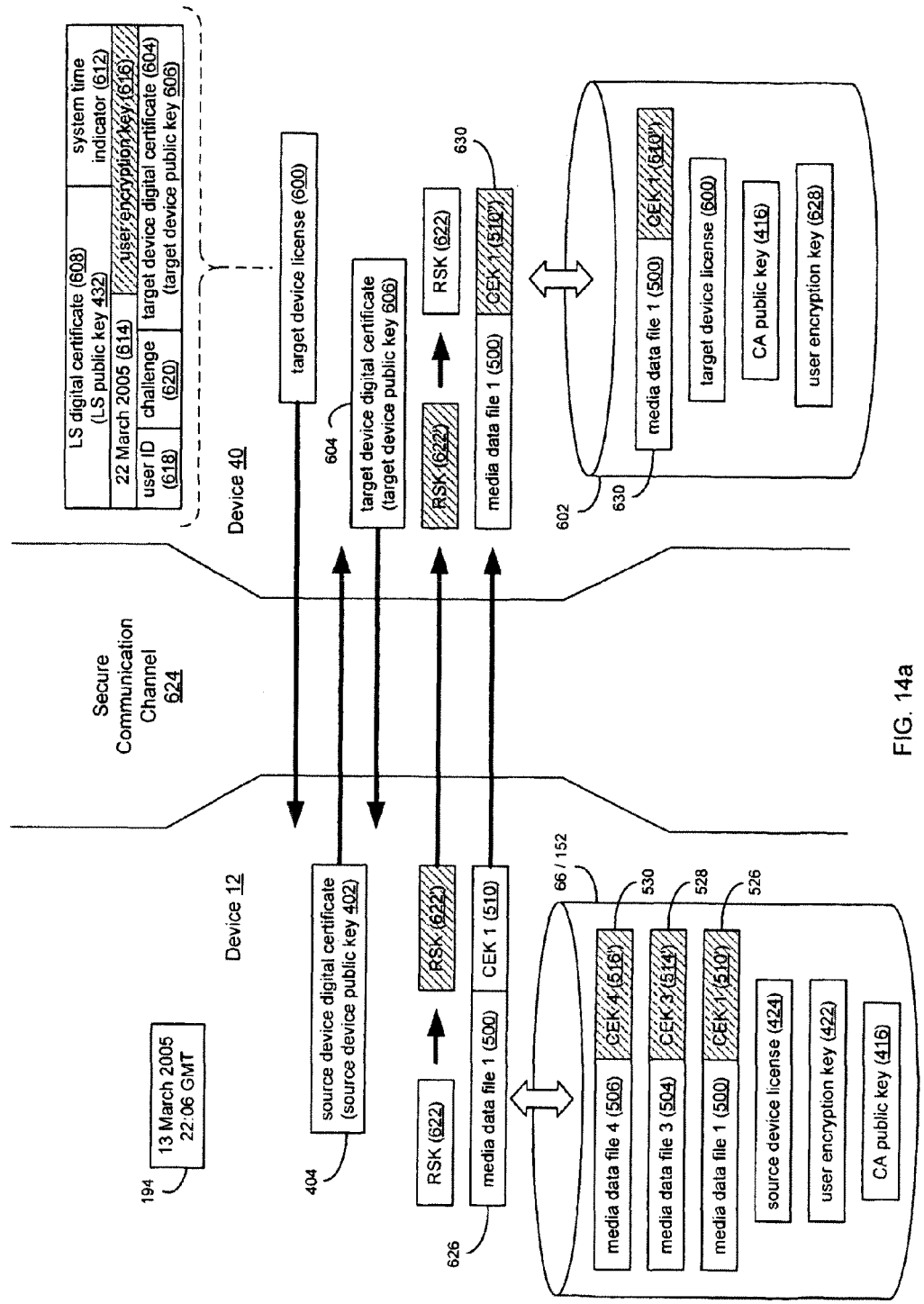
FIG. 14a is a diagrammatic view of two personal media devices coupled to each other via a secure communication channel.
Figure 14B:
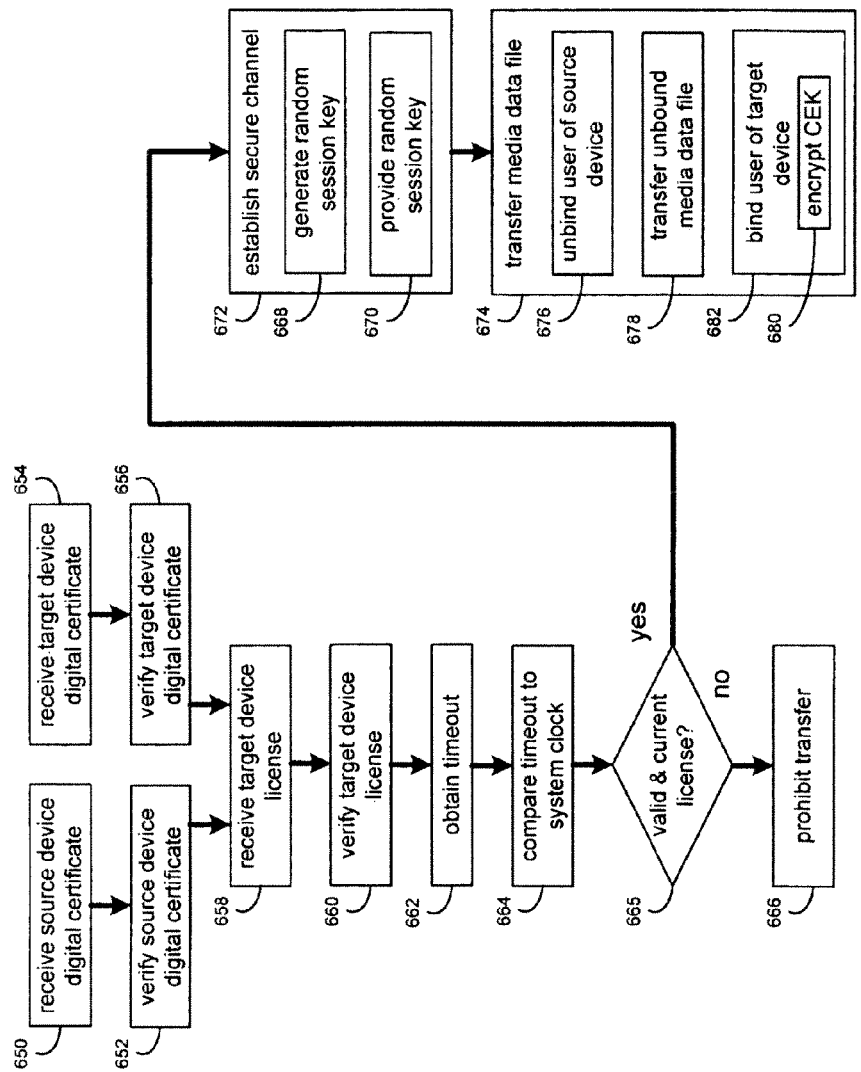
FIG. 14b is a flowchart of a process executed by the DRM process of FIG. 1.

Referring also to FIGS. 14*a* & 14*b* and continuing with the above-stated example, assume that user 14 has downloaded bound media data files 526, 528, 530 which are stored on e.g., storage device 66 within personal media device 12. Further, assume that user 26 (i.e., the owner of personal media device 40) wishes to obtain a copy of bound media data file 526 for playback on personal media device 40. As discussed above, when a device is initialized, a copy of a device license may be transferred to and retained on the personal media device for use when transferring media content between personal media devices. Accordingly, personal media device 12 includes source device license 424 and personal media device 40 includes target device license 600.

Typically, a device-to-device content transfer is initiated by the user of the source device. In the above-stated example, personal media device 12 is the source device and personal media device 40 is the target device. Accordingly, user 14 (i.e., the owner of personal media device 12) may initiate the transfer of bound media data file 526 from personal media device 12 to personal media device 40.

Referring again to FIG. 2, if e.g., user 14 wishes to transfer a media data file to another personal media device, user 14 may e.g., depress menu switch 84, resulting in the generation of e.g., pop-up menu 106. Using slider assembly 88, user 14 may select the "Share Content" command 108 from pop-up menu 106, resulting in the generation of content window 110. From content window 110, user 14 may select the appropriate file for transfer. Assume that user 14 selects "Peggy Sue", which corresponds to bound media data file 526. Once user 14 selects the track for transfer, device application 64 may render a transfer window 112 that e.g., includes a track title field 114 that identifies the title of the track being transferred and an artist field 116 that identifies the artist of the track being transferred.

Transfer window 112 may include a transfer button 118 (selectable via slider assembly 88) for initiating the transfer of bound media data file 526 to e.g., personal media device 40. In this example, if user 14 selects transfer button 118 with slider assembly 88, the transfer of bound media data file 526 (i.e., "Peggy Sue" from "Buddy Holly") from personal media device 12 to (in this example) personal media device 40 is initiated. Transfer window 112 may include a transfer status indicator 120 for indicating the progress of the transfer of e.g., "Peggy Sue" by "Buddy Holly". Transfer window 112 may further include a cancel button 122 for allowing user 14 to cancel the file transfer and close download window 112.

Referring again to FIGS. 14*a* & 14*b*, once the transfer of bound media data file 526 is initiated, the devices may exchange device digital certificates for authentication purposes. For example, DRM process 10 may provide source device digital certificate 404 (which includes source device public key 402) to device personal media device 40 for authentication. Once received 650 and as discussed above, the integrity of source device digital certificate 404 (and, therefore, source device public key 402) may be verified 652 (by personal media device 40) via CA public key 416 (a copy of which is typically stored in non-volatile memory 602 of personal media device 40), as source device digital certificate 404 was issued and digitally signed by e.g., certification authority 412 (FIG. 12*a*) using CA private key 414 (FIG. 12*a*).

Further, personal media device 40 may provide target device digital certificate 604 (which includes target device public key 606) to personal media device 12 for authentication. Once received 654, the integrity of target device digital certificate 604 (and, therefore, target device public key 606) may be verified 656 by DRM process 10 via CA public key 416 (a copy of which is typically stored in non-volatile memory 66/152 of personal media device 12), as target device digital certificate 604 would typically also have been issued and digitally signed by e.g., certification authority 412 (FIG. 12*a*) using CA private key 414 (FIG. 12*a*).

As discussed above and as illustrated in FIG. 3, personal media devices (e.g., personal media device 12) may include a wireless interface 182 for wirelessly-coupling personal media device 12 to network 30 (or network 32) and/or other personal media devices. Wireless interface 182 may be coupled to an antenna assembly 184 for RF communication to e.g., WAP 52, and/or an IR (i.e., infrared) communication assembly 186 for infrared communication with e.g., a second personal media device (such as personal media device 40). Accordingly, communication between personal media devices 12, 40 may occur wirelessly via RF communication and/or infrared communication. Additionally, an external connector (not shown) may be included within each personal media device that allows for the hardwired-interconnection of multiple personal media devices.

Once certificates 404 and 604 are verified 652, 656, personal media device 40 provides target device license 600 to personal media device 12. As with device license 424 (FIG. 12*a*), target device license 600 may include: LS digital certificate 608 (which includes LS public key 432), system time indicator 612, timeout indicator 614 (i.e., for the subscription of user 26), encrypted user encryption key 616 (i.e., for user 26), user ID 618 (i.e., for user 26), challenge 620, and target device digital certificate 604 (which includes a copy of target device public key 606). As with device license 424 (FIG. 12*a*), target device license 600 may have been digitally-signed (by media distribution system 18 using LS private key 434) prior to being provided to personal media device 40.

Upon receiving 658 target device license 600 from personal media device 40, DRM process 10 may verify 660 the integrity of target device license 600. Accordingly, DRM process 10 may verify the integrity of LS digital certificate 608 (and, therefore, LS public key 432). As discussed above, digital certificates are typically issued and digitally signed by e.g., certification authority 412 (FIG. 12*a*) using CA private key 414 (FIG. 12*a*). Accordingly, LS digital certificate 608 may be verified by DRM process 10 using CA public key 416.

DRM process 10 may use LS public key 432 (included within LS digital certificate 608) to verify target device license 600 (which was digitally signed using LS private key 434 (FIG. 12*a*)). DRM process 10 may additionally verify 665 that user 26 has a valid subscription to media distribution system 18 by obtaining signal 662 and comparing 664 timeout indicator 614 to system clock 194. For example, as user 26 has a valid subscription through 22 Mar. 2005 (as defined by timeout indicator 614) and the current date and time (as defined by system clock 194) is 22:06 GMT on 13 Mar. 2005, the subscription of user 26 (with respect to media distribution system 18) is valid and current.

Assuming that the integrity of target device license 600 is verified, the transfer of bound media data file 526 may begin. Depending on the manner in which DRM system 10 is configured, user 26 may be required to have a valid and current subscription (with media distribution system 18) prior to initiating the transfer of any media data files to personal media device 40, or else the transfer may be prohibited 666. However and as discussed above, since personal media devices check for the existence of a valid and current subscription prior to rendering media data files, even if the transfer was effectuated while user 26 did not have a valid and current subscription with media distribution system 18, user 26 would be prohibited from rendering the transferred media data files. Accordingly, DRM system 10 may be configured to allow for the transfer of one or more media data files from source device 12 to target device 40 even if user 26 does not have a valid and current subscription, since (as discussed above) target device 40 will not be allowed to render the transferred media data file(s) until user 26 has a valid and current subscription.

Additionally, source device 12 (and/or user 14) may be required to have a valid and current subscription prior to being allowed to transfer a media data file to target device 40. Accordingly, prior to transferring a media data file, source device 12 may examine their own timeout indicator (i.e., timeout indicator 420, FIG. 12*a*) to verify that user 14 has a valid and current subscription. Alternatively/additionally, target device 40 may receive (from source device 12) and process device license 424 (FIG. 12*a*) so that timeout indicator 420 of the source device 12 can be verified prior to the media data file being transferred.

In order to effectuate the media data file transfer, DRM process 10 generates 668 a random session key (i.e., RSK) 622, which may be encrypted using target device public key 606 (included within target device digital certificate 604) to generate encrypted RSK 622'. DRM process 10 provides 670 encrypted RSK 622' to personal media device 40, which may be decrypted (using target device private key (not shown)) to retrieve RSK 622. RSK 622 may be a 1024-bit symmetric encryption key.

As personal media device 12 and personal media device 40 each contain a copy of RSK 622, a secure communication channel 624 may be established 672 between devices 12, 40, in which all data transferred 674 across secure communication channel 624 may be encrypted (using RSK 622) prior to transmission and decrypted (using RSK 622) upon receipt. Secure communication channel 624 may be a wireless communication channel (using e.g., RF communication and/or infrared communication), or a wired communication channel (using an external connector (not shown) on devices 12, 40).

DRM process 10 may retrieve (from e.g., storage device 66) bound media data file 526 for transmission to personal media device 40. However and as discussed above, as CEK 510' of bound media data file 526 was encrypted using the encryption key of user 12 (e.g., user encryption key 422), bound media data file 526 will not be accessible (in its current form) by user 26. Therefore, bound media data file 526 must be unbound 676 from user 12 and bound to user 26. Accordingly, DRM process 10 obtains bound media data file 526 from e.g., storage device 66 and decrypts CEK 510' (using user encryption key 422) to obtain CEK 510. Unbound media data file 626 may be transferred 678 (via secure communication channel 624) from personal media device 12 to personal media 40. Upon receipt, personal media device 40 may encrypt 680 CEK 510 of unbound media data file 626, using the encryption key of user 26 (i.e., user encryption key 628) to generate 682 bound media data file 630, which includes encrypted CEK 510". Personal media device 40 may store bound media data file 630 for subsequent rendering in nonvolatile memory 602.

User encryption key 422 is described above as typically being a symmetric encryption key, in that the same key that may be used to encrypt a CEK may also be used to decrypt the encrypted version of the CEK. Further and as described above, the same user encryption key 422 may be used to encrypt all CEK's. Therefore, if one-hundred bound media data files are downloaded to and stored upon personal media device 12, the same user encryption key 422 may be used to decrypt each of the one-hundred encrypted CEKs. However, other configurations of user encryption key 422 are possible.

Figure 15:
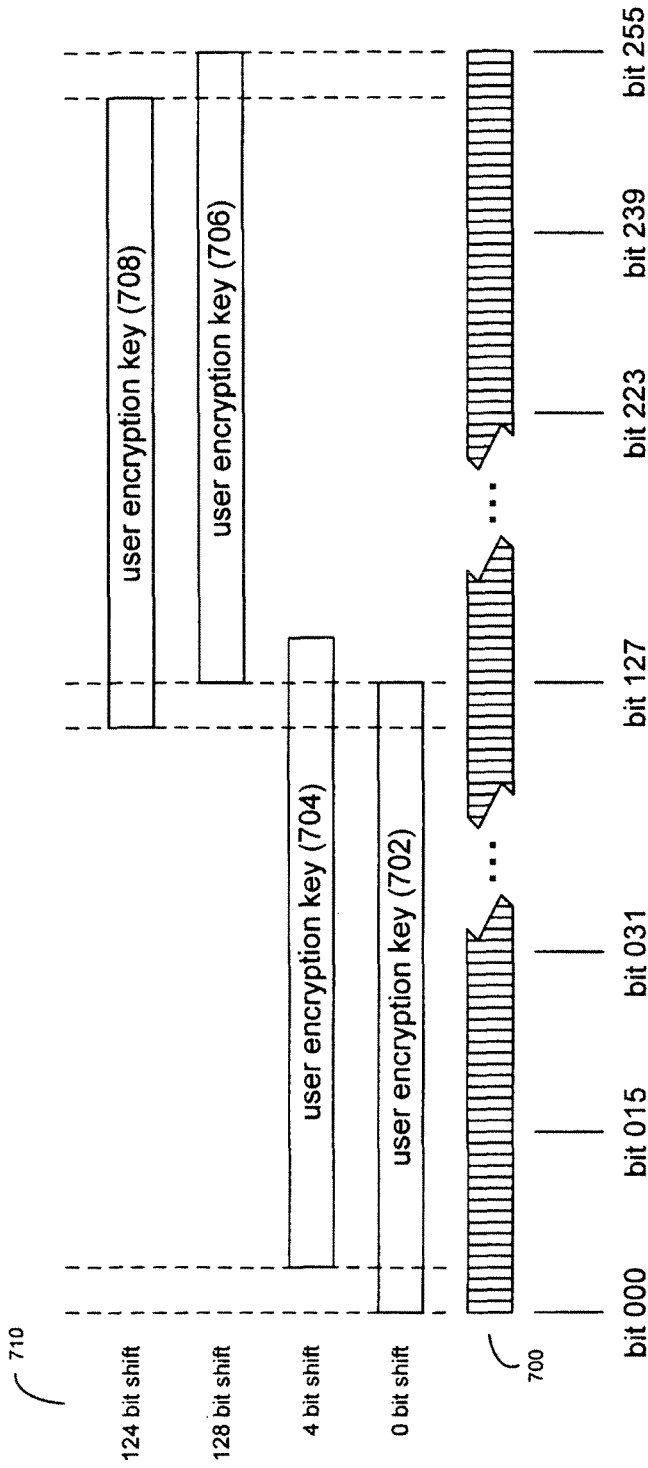
FIG. 15 is a diagrammatic view of an asymmetric key block.

For example, user encryption key 422 may be a symmetric key block, as opposed to a single symmetric key. Referring also to FIG. 15, there is shown a 32-byte (i.e., 256-bit) symmetric key block 700. Assume for this example that a 16-byte (i.e., 128-bit) key is used to encrypt and decrypt each encrypted CEK. Through the use of one e.g., 256-bit symmetric key block 700, multiple 128-bit symmetric keys (e.g., user encryption keys 702, 704, 706, 708 may be defined. For example, a first user encryption key 702 may be defined as bits 000-127 of symmetric key block 700. A second user encryption key 704 may be defined as bits 004-131 of symmetric key block 700. A third user encryption key 706 may be defined as bits 128-255 of symmetric key block 700. And a fourth user encryption key 708 may be defined as bits 124-251 of symmetric key block 700. Accordingly, a plurality of unique symmetric user encryption keys may be defined using a single symmetric key block 700. Accordingly, to properly define the individual user encryption keys, in this particular example, a bit shift parameter 710 may be defined for each user encryption key 702, 704, 706, 708, which defines the starting point of the respective key. For example, user encryption key 702 starts at bit-0 of symmetric key block 700 and, therefore, has a bit shift 710 of 0-bits. As user encryption key 704 starts at bit-4 of symmetric key block 700, user encryption key 704 has a bit shift 710 of 4-bits. As user encryption key 706 starts at bit-128 of symmetric key block 700, user encryption key 706 has a bit shift 710 of 128-bits. As user encryption key 708 starts at bit-124 of symmetric key block 700, user encryption key 708 has a bit shift 710 of 124-bits.

While various user encryption keys are defined within symmetric key block 700 by shifting the starting point of each individual user encryption key, other configurations are possible. For example, keys may be defined using only odd or even bits in conjunction with a bit shift. Additionally and/or alternatively, keys may be defined within symmetric key block 700 algorithmically, in that an algorithm may be used to define the individual bits used (within symmetric key block 700) to define a unique user encryption key.

A number of implementations have been described. Nevertheless, it will be understood that various modifications may be made. Accordingly, other implementations are within the scope of the following claims.

What is claimed is:

1. A method of transferring an encrypted media data file from a source electronic device to a target electronic device, the method comprising:
   receiving an indication from the source electronic device that an encrypted media data file is available for transfer to the target electronic device;
   providing to the source electronic device a target device license to indicate that the target electronic device has a valid subscription to a media distribution system from which the media data file was transferred to the source electronic device, wherein the target device license is unique to the target device and different from a source device license for the encrypted media data file;
   receiving the encrypted media data file from the source electronic device, the encrypted media data file being transferred from the source electronic device to the target electronic device responsive to the source electronic device providing an indication of having a valid subscription;
   storing the received encrypted media data file within a storage device of the target electronic device responsive to the target electronic device having a valid subscription;
   decrypting the encrypted media data file with the target electronic device to generate a decrypted media data file; and
   rendering the decrypted media data file with the target electronic device.

2. The method of claim 1, wherein the target device license is a valid device license for the encrypted media data file and includes a timeout indicator to provide an expiration date of the subscription to the media distribution system.

3. The method of claim 1, further comprising disabling the decrypting or preventing the rendering of the encrypted media data file responsive to expiration of the subscription to the media distribution system.

4. The method of claim 1, further comprising indicating that the target electronic device has an invalid subscription, which includes:
   indicating that the subscription is invalid after:
      an expiration of a predetermined time period; and
      a valid device license has not been provided to the target electronic device during the predetermined time period.

5. The method of claim 1, wherein the target device license is generated by the media distribution system and comprises a timeout indicator, a target device digital certificate, and an encrypted user encryption key.

6. The method of claim 5, wherein the target device license further comprises a licensing service digital certificate.

7. A non-transitory computer readable storage medium having a plurality of instructions stored thereon which, when executed by a processor, cause the processor to perform operations comprising:
   receiving indication from the source electronic device that an encrypted media data file is available for transfer to a target electronic device;
   providing to the source electronic device a target device license to indicate that the target electronic device has a valid subscription to a media distribution system from which the media data file was transferred to the source electronic device, wherein the target device license is unique to the target device and different from a source device license;
   receiving the encrypted media file from a source electronic device, the encrypted media data file being transferred from the source electronic device to the target electronic device responsive to the source electronic device providing an indication of having a valid subscription;
   storing the received encrypted media data file within a storage device of the target electronic device responsive to the target electronic device having a valid subscription;
   decrypting the encrypted media data file with the target electronic device to generate a decrypted media data file; and
   rendering the decrypted media data file with the target electronic device.

8. The method of claim 7, wherein the target device license is generated by the media distribution system and comprises a timeout indicator, a target device digital certificate, and an encrypted user encryption key.

9. The method of claim 8, wherein the target device license further comprises a licensing service digital certificate.

10. A method for transferring a media data file from a source electronic device to a target electronic device comprising:
   indicating that an encrypted media data file is available for transfer to the target electronic device;
   receiving an indication on the source electronic device to transfer the media data file to a target electronic device;
   receiving from the target electronic device an indication that the target electronic device has a valid subscription, the indication comprising a target device license that is unique to the target device and different from a device license of the source electronic device;

transferring the media data file to the target electronic device in response to the indication to transfer the media data file and in response to the source electronic device providing an indication of having a valid subscription; and enabling a rendering of the media data file on the target electronic device responsive to the target electronic device having a valid subscription.

11. The method of claim 10 further comprising:

indicating that the subscription is invalid after an expiration of a predetermined time period; and disabling a decrypting or preventing the rendering of the encrypted media file responsive to the indicating that the subscription is invalid.

12. The method of claim 10 further comprising:

verifying the integrity of the target electronic device license.

13. The method of claim 10 wherein the target electronic device license is digitally-signed by a licensing service.

14. The method of claim 10, wherein the target device license is generated by the media distribution system and comprises a timeout indicator, a target device digital certificate, and an encrypted user encryption key.

15. The method of claim 14, wherein the target device license further comprises a licensing service digital certificate.

* * * * *